(12) United States Patent
Yamamoto et al.

(10) Patent No.: US 10,496,606 B2
(45) Date of Patent: Dec. 3, 2019

(54) INFORMATION PROCESSING DEVICE, INFORMATION PROCESSING METHOD, AND PROGRAM

(71) Applicant: SONY CORPORATION, Tokyo (JP)

(72) Inventors: Noriyuki Yamamoto, Kanagawa (JP); Seiichi Takamura, Tokyo (JP); Masashi Sekino, Tokyo (JP)

(73) Assignee: SONY CORPORATION, Tokyo (JP)

( * ) Notice: Subject to any disclaimer, the term of this patent is extended or adjusted under 35 U.S.C. 154(b) by 296 days.

(21) Appl. No.: 15/505,831

(22) PCT Filed: Jun. 22, 2015

(86) PCT No.: PCT/JP2015/067910
§ 371 (c)(1),
(2) Date: Feb. 22, 2017

(87) PCT Pub. No.: WO2016/035424
PCT Pub. Date: Mar. 10, 2016

(65) Prior Publication Data
US 2017/0249326 A1    Aug. 31, 2017

(30) Foreign Application Priority Data
Sep. 5, 2014    (JP) .................. 2014-180940

(51) Int. Cl.
| | |
|---|---|
| *G06F 16/00* | (2019.01) |
| *G06F 16/16* | (2019.01) |
| *G06Q 30/02* | (2012.01) |
| *G06Q 30/06* | (2012.01) |

(52) U.S. Cl.
CPC ....... *G06F 16/166* (2019.01); *G06Q 30/0202* (2013.01); *G06Q 30/0252* (2013.01); *G06Q 30/0631* (2013.01)

(58) Field of Classification Search
CPC .............. G06F 16/166; G06F 16/2452; G06F 16/24534; G06Q 30/0202; G06Q 30/0252; G06Q 30/0631
See application file for complete search history.

(56) References Cited

U.S. PATENT DOCUMENTS

| | | | |
|---|---|---|---|
| 9,384,248 B2 * | 7/2016 | Ryman | .............. G06F 16/24547 |
| 10,108,697 B1 * | 10/2018 | Poteet | ...................... G06F 16/38 |
| 2003/0115194 A1 * | 6/2003 | Pitts | .................. G06F 16/24542 |

(Continued)

FOREIGN PATENT DOCUMENTS

| | | |
|---|---|---|
| JP | 2000-059515 A | 2/2000 |
| JP | 2001-229171 A | 8/2001 |

(Continued)

*Primary Examiner* — Noosha Arjomandi
(74) *Attorney, Agent, or Firm* — Xsensus LLP

(57) ABSTRACT

To make it possible to enhance convenience for users and a seller of content. There is provided an information processing device including: a schema converting unit that converts content meta-information managed by a plurality of different management systems into a common schema; and a recommendation unit that determines a combination of content to be recommended and a user based on commonized content meta-information which is obtained by the conversion into the common schema and content purchase history information in the respective management systems.

14 Claims, 16 Drawing Sheets

(56) References Cited

U.S. PATENT DOCUMENTS

| | | | |
|---|---|---|---|
| 2006/0291506 A1* | 12/2006 | Cain | H04N 21/2547 370/486 |
| 2007/0244924 A1* | 10/2007 | Sadovsky | G06F 16/437 |
| 2008/0103945 A1* | 5/2008 | Cooper | G06Q 10/087 705/28 |
| 2009/0125413 A1* | 5/2009 | Le Chevalier | G06Q 30/06 705/26.1 |
| 2011/0145278 A1* | 6/2011 | Maes | G06Q 10/06 707/769 |
| 2015/0039651 A1* | 2/2015 | Kinsely | G06F 16/254 707/779 |
| 2015/0088868 A1* | 3/2015 | Jordan | G06F 16/248 707/722 |
| 2015/0112826 A1* | 4/2015 | Crutchfield, Jr. | G06Q 30/0601 705/26.1 |
| 2016/0140173 A1* | 5/2016 | Kumar | G06F 16/24534 707/706 |

FOREIGN PATENT DOCUMENTS

| | | |
|---|---|---|
| JP | 2002-197224 A | 7/2002 |
| JP | 2005-293384 A | 10/2005 |
| JP | 2006-018755 A | 1/2006 |
| JP | 2008-186431 A | 8/2008 |
| JP | 2009-071499 A | 4/2009 |
| JP | 2013-034069 A | 2/2013 |
| JP | 2014-119805 A | 6/2014 |
| WO | 2012049987 A1 | 4/2012 |

* cited by examiner

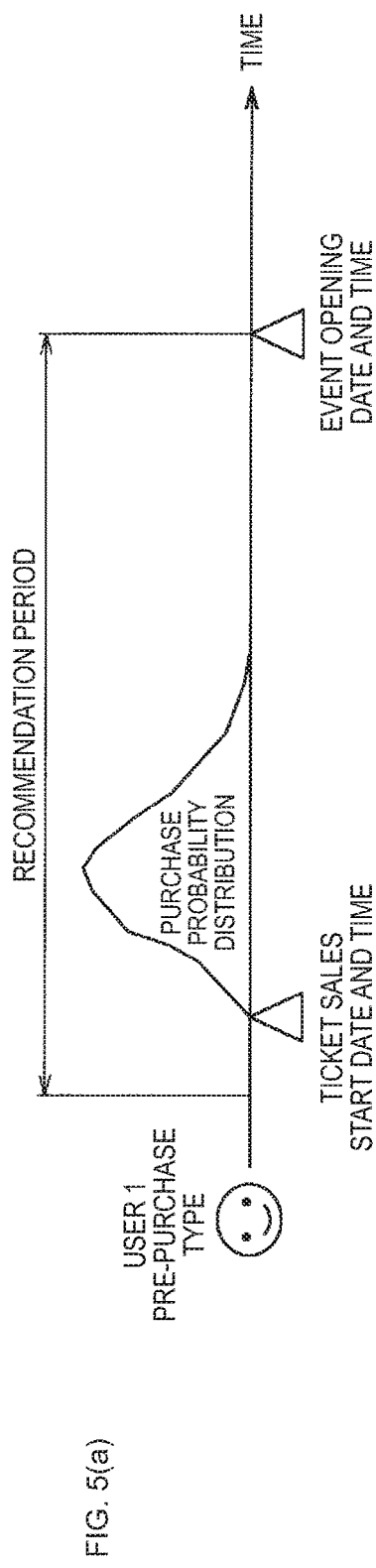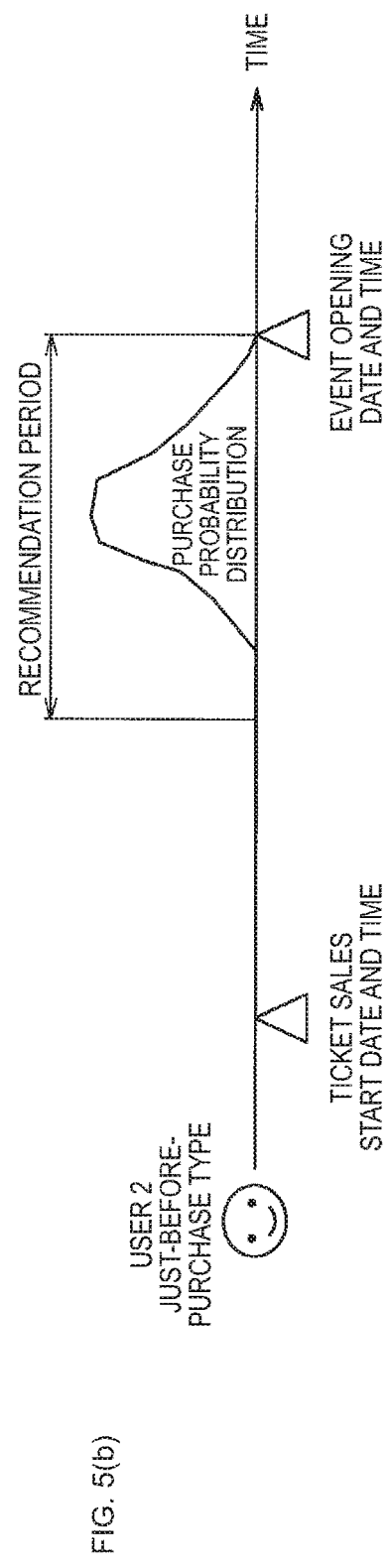

FIG. 7

| EVENT INFORMATION REGISTRATION | | |
|---|---|---|
| EVENT TITLE | xxx CONCERT | |
| ARTIST | A, B, C | |
| VENUE | OO HALL | |
| OPENING DATE AND TIME | AUGUST 8, 2014 | |

SALES SITE REGISTRATION

| SALES SITE | SALES START DATE AND TIME | SALES END DATE AND TIME | SALES REGION | NUMBER OF SOLD TICKETS | SALES STRATEGY |
|---|---|---|---|---|---|
| SALES SITE X | JULY 7 (MONDAY) | AUGUST 1 (FRIDAY) | TOKYO | 2000 | PRE-PURCHASE |
| SALES SITE Y | JULY 7 (MONDAY) | AUGUST 1 (FRIDAY) | KANTO | 1000 | JUST BEFORE PURCHASE |
| HOST COMPANY SITE | JULY 1 (TUESDAY) | JULY 4 (FRIDAY) | KANTO | 500 | PRE-PURCHASE |
| HOST COMPANY SITE | JULY 7 (MONDAY) | AUGUST 8 (FRIDAY) | TOKYO | 2500 | PRE-PURCHASE |

ADVERTISEMENT CREATIVE

TITLE
ARTIST NAME
DATE AND TIME
PLACE
PHOTO

CHANGING RIGHT
SALES SITE X

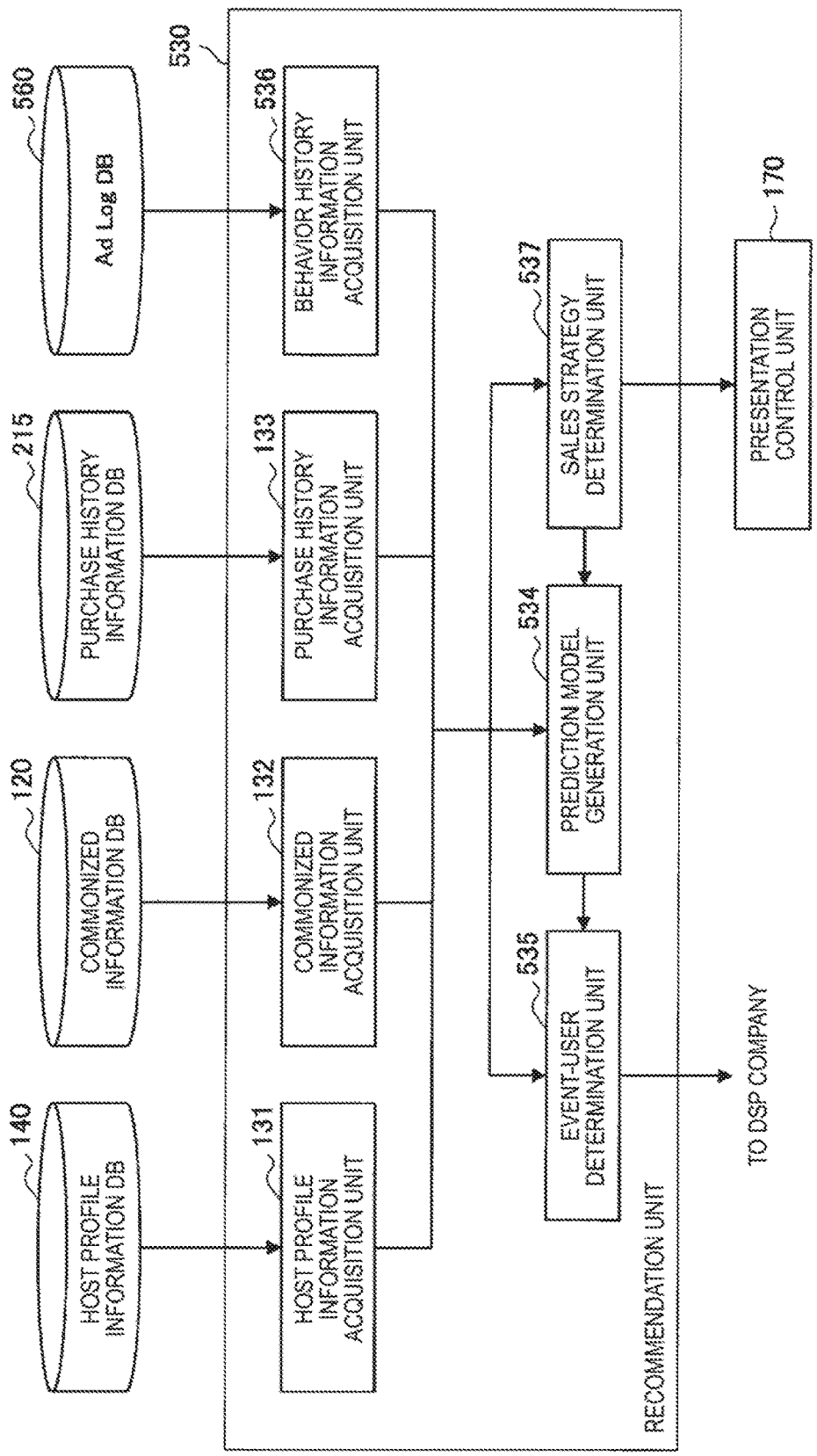

FIG. 13

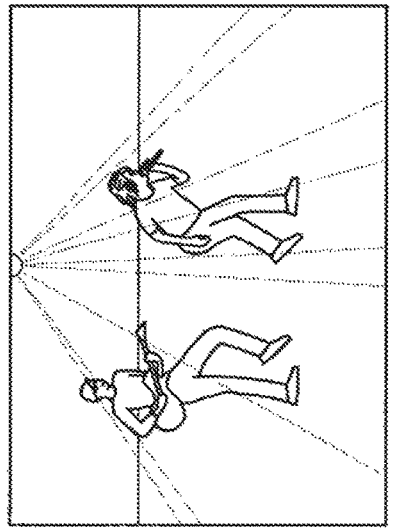

○○○○ LIVE TOUR 2014

| EVENT INFORMATION | |
|---|---|
| PERFORMANCE DAY | JULY 1, 2014 |
| VENUE | △△ HALL |
| TICKET TYPE AND PRICE | ALL SEATS RESERVED 8,900 YEN (TAX INCLUDED) |
| VENUE OPENING TIME/ PERFORMANCE START TIME | 17:30 VENUE OPENING/ 18:30 PERFORMANCE START |
| CONTACT | 03-xxxx-xxxx |

| TICKET SALES INFORMATION | |
|---|---|
| SALES SITE X | CODE:xxxxxx TEL:03-xxxx-xxxx |
| SALES SITE Y | CODE:xxx-xxx TEL:03-xxxx-xxx |
| SALES SITE Z | CODE:xxxxxx TEL:03-xxxx-xxxx |

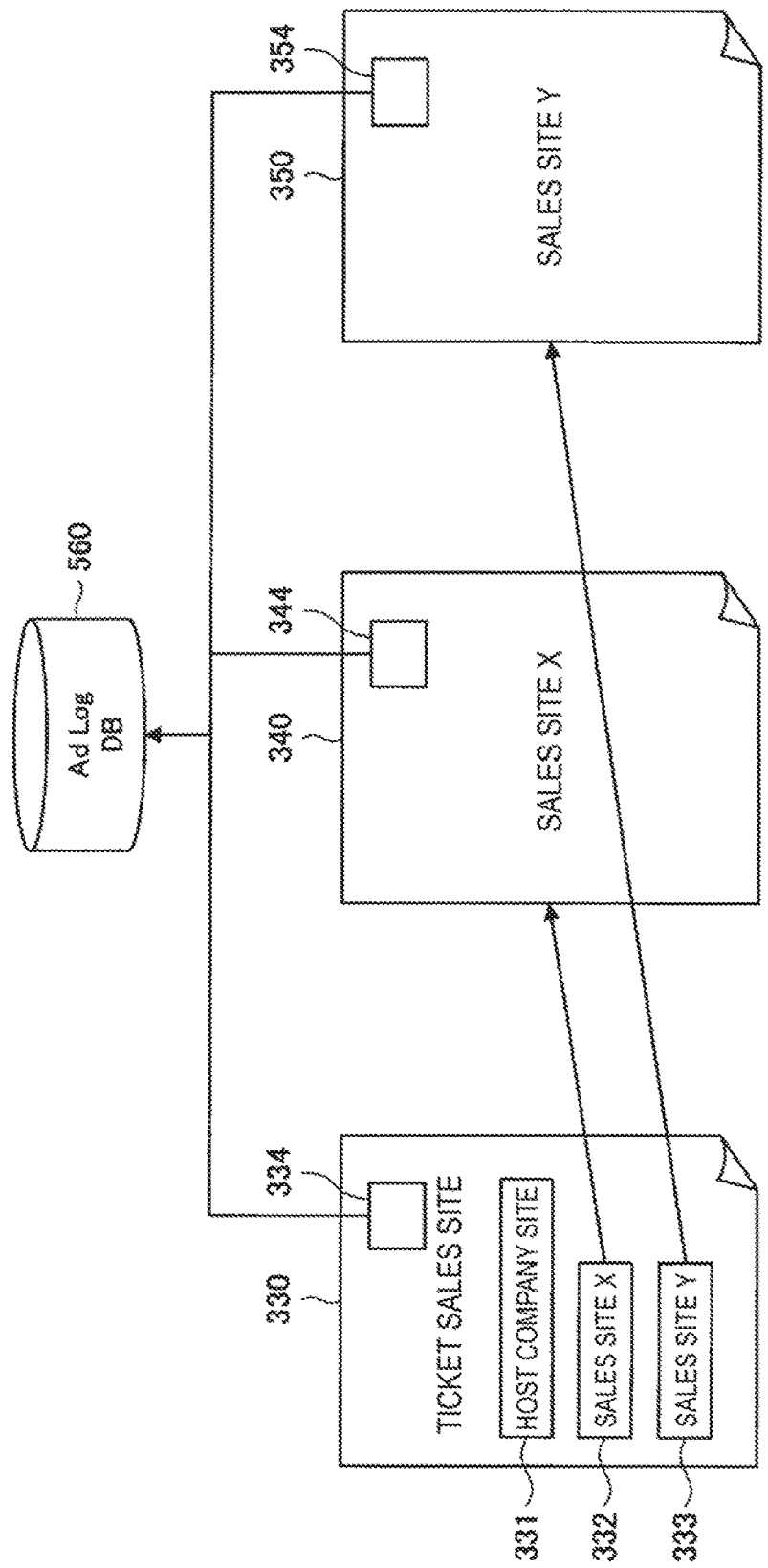

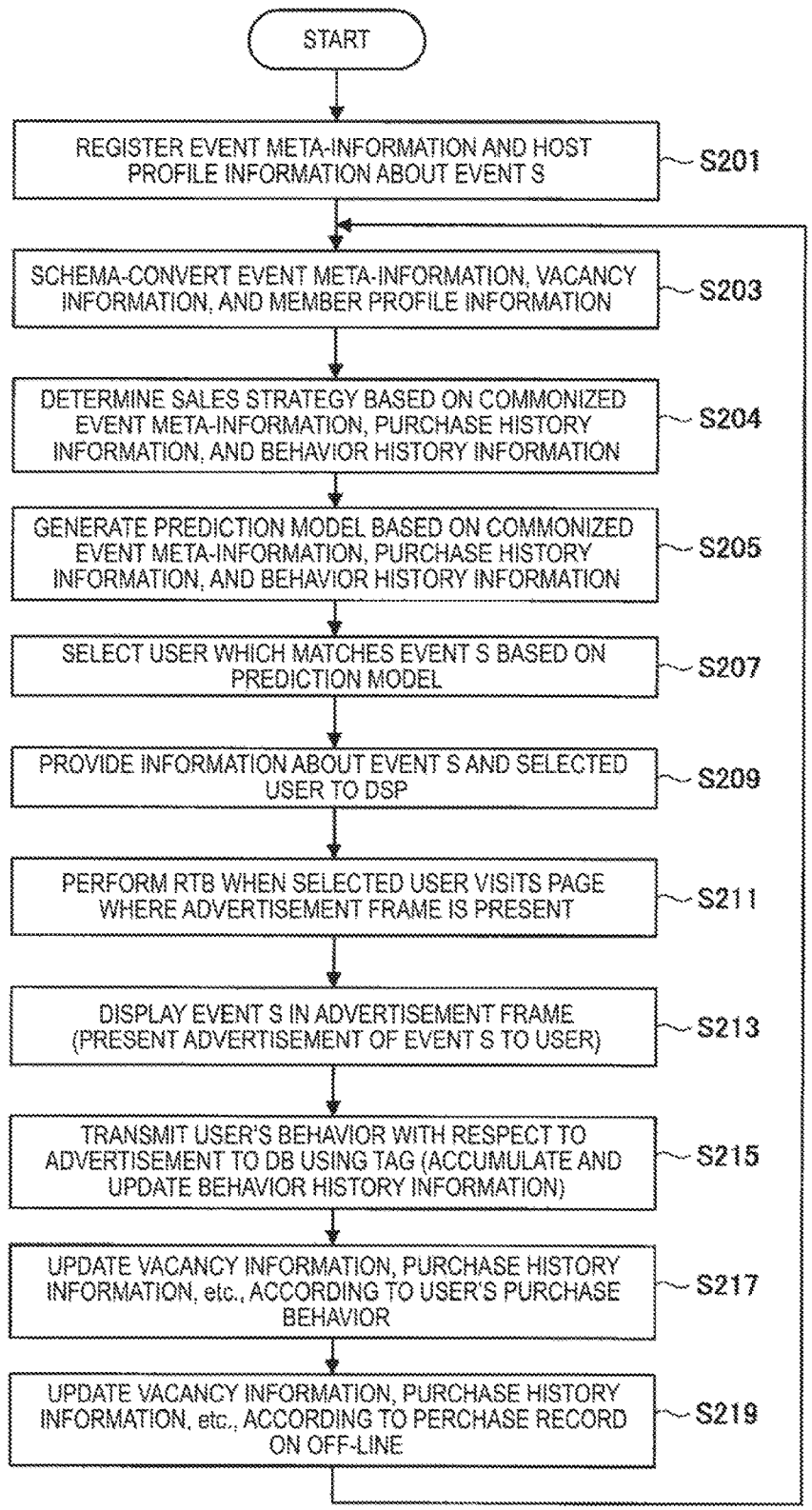

INFORMATION PROCESSING DEVICE, INFORMATION PROCESSING METHOD, AND PROGRAM

CROSS REFERENCE TO RELATED APPLICATIONS

This application is a U.S. National Phase of International Patent Application No PCT/JP2015/067910 filed on Jun. 22, 2015, which claims priority benefit of Japanese Patent Application No. JP 2014-180940 filed in the Japan Patent Office on Sep. 5, 2014. Each of the above-referenced applications is hereby incorporated herein by reference in its entirety.

TECHNICAL FIELD

The present disclosure relates to an information processing device, an information processing method, and a program.

BACKGROUND ART

Generally, techniques that recommend various types of content (for example, events such as a concert, a theater, or a movie) to a user have been developed. For example, Patent Literature 1 discloses a technique that receives location information from mobile communication terminals carried by users and delivers event information on an event to a mobile communication terminal which is within a predetermined range from a venue of the event and for which a location information acquisition date and time is earlier than an event execution date and time.

Further, in an event in which seats are provided, such as a concert, a user generally purchases a ticket of the event while selecting a seat. Patent Literature 2 discloses a technique that prepares electronic tickets of an event to smoothly enabling guidance of users to gates of a venue.

CITATION LIST

Patent Literature

Patent Literature 1: JP 2009-71499A

DISCLOSURE OF INVENTION

Technical Problem

Here, in an entertainment event (for example, concerts, theaters, sport games, movies, lectures, or the like) in which an impresario or a host (hereinafter, collectively referred to as a host, for ease of description) is present, in many cases, each host has an individual event management system or ticket sales system. Furthermore, generally, each host manages information on ticket purchase histories of users or the like. In the techniques disclosed in Patent Literatures 1 and 2, such a case in which contents are managed by different management systems is not sufficiently considered.

In consideration of the above-described problems, there is room for improving a system that recommends content to users or a system that sells content to users into a system that is convenient for the users and a seller of the content. Accordingly, the present disclosure provides an information processing device, an information processing method, and a program, which are new and improved, capable of enhancing convenience for users and a seller of content.

Solution to Problem

According to the present disclosure, there is provided an information processing device including: a schema converting unit that converts content meta-information managed by a plurality of different management systems into a common schema; and a recommendation unit that determines a combination of content to be recommended and a user based on commonized content meta-information which is obtained by the conversion into the common schema and content purchase history information in the respective management systems.

According to the present disclosure, there is provided an information processing method including: converting content meta-information managed by a plurality of different management systems into a common schema, using a processor; and determining a combination of content to be recommended and a user based on commonized content meta-information which is obtained by the conversion into the common schema and content purchase history information in the respective management systems.

According to the present disclosure, there is provided a program that causes a processor of a computer to realize: a function for converting content meta-information managed by a plurality of different management systems into a common schema; and a function for determining a combination of content to be recommended and a user based on commonized content meta-information which is obtained by the conversion into the common schema and content purchase history information in the respective management systems.

According to the present disclosure, event meta-information managed by a plurality of different management systems is converted into a common schema. Accordingly, it is possible to comprehensively handle content purchase history information in the respective management systems using the common schema. Thus, it is possible to determine a combination of content to be recommended and a user comprehensively using the content purchase history information in the respective management systems, and thus, it is possible to determine an appropriate combination thereof, and to promote a user's purchase behavior.

Advantageous Effects of Invention

As described above, according to the present disclosure, it is possible to enhance convenience for users and a seller of content. Note that the effects described above are not necessarily limitative. With or in the place of the above effects, there may be achieved any one of the effects described in this specification or other effects that may be grasped from this specification.

BRIEF DESCRIPTION OF DRAWINGS

FIGS. 5(*a*) and 5(*b*) are an illustrative diagrams for describing a sales strategy determination process based on user's behavior tendency information.

FIG. 7 is a diagram illustrating a display example of an information input screen to which a variety of information is input by a host.

FIG. 12 is a functional block diagram illustrating an exemplary functional configuration of a recommendation unit shown in FIG. 11.

FIG. 13 is an illustrative diagram for describing a method for acquiring behavior history information.

FIG. 14 is an illustrative diagram for describing a method for acquiring behavior history information.

FIG. 15 is a flowchart illustrating an exemplary processing procedure of an information processing method according to the second embodiment.

MODE(S) FOR CARRYING OUT THE INVENTION

Figure 1:
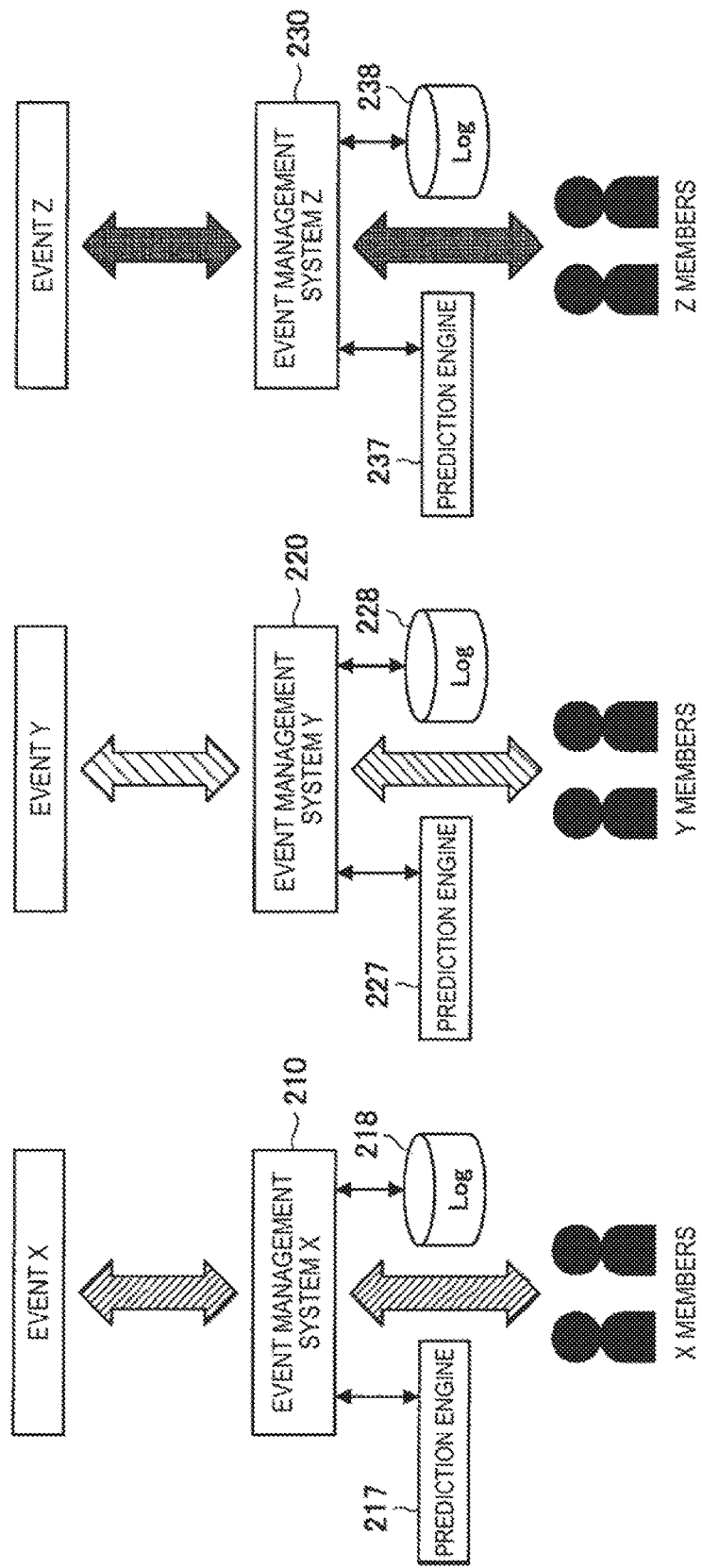
FIG. 1 is an illustrative diagram for describing an overview of a general system.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be made in the following order.
1. General system
2. First Embodiment
   2-1. Overview of system
   2-2. Configuration of system
   2-3. Information processing method
   2-4. Display example
   2-5. Modification example
3. Second Embodiment
   3-1. Targeting advertisement
   3-2. Overview of system
   3-3. Configuration of system
   3-4. Specific example of method for acquiring behavior history information
   3-5. Information processing method
4. Hardware configuration
5. Supplement Here, in first and second embodiment of the present disclosure, a system that recommends content to a user will be described. In the following description, when a system is simply mentioned, it represents such a recommendation system unless otherwise described.

The content handled in the first and second embodiments may be all types of content that can be generally purchased by users, such as video, music, books, or household goods (food or drinks, clothing, appliances, or the like). Here, in the first and second embodiment, for example, an event in which the number of seats (seating capacity) is limited, such as a concert, a theater, a movie, or a tour or a travel, is suitably considered as the content. In an event in which the number of seats is limited, a sales period and the number of tickets for sale are limited, and as an opening date and time comes and the number of remaining seats decreases, the sales period or the number of tickets for sale is changed from time to time. In this specification, such content for which at least one of the sales period and the number of tickets for sale is limited and the sales period and the amount for sale are changeable from time to time is referred to as quantitative merchandise. As another type of quantitative merchandise other than the above-described quantitative merchandise, for example, coupons, products, or the like handled in flash marketing may be used.

The first and second embodiments achieve more significant effects when such quantitative merchandise is recommended to users. Accordingly, in the following description, a case where content recommended by the system is an event which is handled as quantitative merchandise will be described as an example. In the following description, when an event is simply mentioned, it represents an event handled as such quantitative merchandise unless otherwise described. Here, as described above, the content handled in the first and second embodiments is not limited to these examples, and in the first and second embodiments, all types of content may be recommended to users.

1. General System

First, before describing the first and second embodiments of the present disclosure, in order to more clarify the present disclosure, a general system will be described with reference to FIG. 1. FIG. 1 is an illustrative diagram for describing an overview of a general system.

Generally, an event is managed by a host of the corresponding event (hereinafter, also referred to as an event host, an impresario, or the like). In a system 4 illustrated in FIG. 1, an event X, an event Y, and an event Z are managed by an event management system X210 which is an event management system of the event host X, an event management system Y220 which is an event management system of the event host Y, and an event management system Z230 which is an event management system of the event host Z, respectively. In the following description, when the event management system X210, the event management system Y220, and the event management system Z230 are not particularly distinguished, they are simply referred to as management systems.

The event management system X210, the event management system Y220, and the event management system Z230 have members, respectively. For example, a member (X member) of the event management system X210 is a user who registers his/her own profile information in the event management system X210, and is capable of purchasing a ticket of an event managed by the event management system X210 through the event management system X210. Similarly, a member (Y member) of the event management system Y220 and a member (Z member) of the event management system Z230 register their own profile information in the event management system Y220 and the event management system Z230, and are capable of purchasing tickets of events managed by the event management systems to which the members belong through the management systems, respectively.

Here, the event management may include a sales management of event tickets, a management of event meta-information (a variety of meta-information about the event), a management of profile information of members, a management of ticket purchase history information of the members, a management of event recommendation, and the like. The event management system X210, the event management system Y220, and the event management system Z230 perform the above-described various managements about events which are respectively registered therein.

In actual business conditions, there may be a case in which a host of an event and a manager of the event are different from each other. For example, there may be a case in which a host of an event entrusts a ticket sales management of the event to a commission agent for ticket sales. The event management system X210, the event management system Y220, and the event management system Z230 shown in FIG. 1 schematically show management systems that comprehensively perform the above-described various event managements, and the inside of each management system may be configured by a plurality of smaller-sized systems by a plurality of agents.

The event management system X210 includes a prediction engine 217 that predicts a recommendation event for X members who are members of the event management system X210, and a log 218 in which purchase history information about the X members is accumulated. The event management system X210 has a function for predicting an event which is likely to be interesting for the X members, for each X member, using the prediction engine 217 and recommending the predicted event to each X member. The prediction engine 217 may be a prediction engine used in a general recommendation system. For example, the prediction engine 217 may make reference to a previous event purchase tendency of an X member who is a recommendation target, a purchase history of another X member having a similar purchase tendency, or the like, by referring to the log 218, to thereby predict an event to be recommended to the X member.

Similarly, the event management system Y220 and the event management system Z230 have prediction engines 227 and 237, and logs 228 and 238, respectively, and have a function for recommending an event to their own members.

Here, as described above, in sales and recommendation of tickets of an event, there may be a case in which a host of the event and a manager of the event are different from each other. Accordingly, for example, the same event may be entrusted to a plurality of different ticket sales agents. Furthermore, the same user may be members of a plurality of different management systems. In this way, in reality, there may be a case in which the event management system X210, the event management system Y220, and the event management system Z230 manage the same event. In addition, the same user may be included in the X members, the Y members, and the Z members.

However, in the general system 4, the event management system X210, the event management system Y220, and the event management system Z230 are not associated with each other, and cannot be involved in events and members managed by other management systems. For example, in the system 4, tickets of the event X can be purchased only by the X members through the event management system X210, and the Y members or the Z members cannot purchase the tickets of the event X through the event management system Y220 or the event management system Z230. Furthermore, for example, even in recommendation of an event for members, the event management system X210 is capable of merely recommending the event X managed by the event management system X210 to the X members, based on a result predicted by the prediction engine 217 provided in the event management system X210 using the log 218 accumulated in the event management system X210. In this way, in the system 4, the prediction engine 217 is not capable of using the logs 228 and 238 of the other management systems in the prediction process, and the event management system X210 is not capable of recommending events managed by the other management systems to the X members.

In the general system 4, in many cases, methods for managing a variety of information relevant to events or members of the event management system X210, the event management system Y220, and the event management system Z230 are different from each other. For example, in the event management system X210 and the event management system Y220, schemas in registering event meta-information may be different from each other. Accordingly, even if the event management system X210, the event management system Y220, and the event management system Z230 simply share the event meta-information or member profile information, it is difficult to determine whether events or members registered in the respective management systems represent the same events or users.

As described above, in the general system 4, the event management system X210, the event management system Y220, and the event management system Z230 individually manage events and members. Accordingly, even when the same event or the same user is registered in different management systems, the system 4 is not capable of recognizing the fact, and the accuracy of event recommendation to users or convenience in ticket purchase of users is not necessarily optimized.

The present inventors intensively studied a technique capable of enhancing convenience of users in consideration of the above problems, and as a result, conceived preferred embodiments of the present disclosure described hereinafter. Hereinafter, the preferred embodiments of the present disclosure conceived by the present inventors will be described in detail.

2. First Embodiment 2-1. Overview of System

Figure 2:
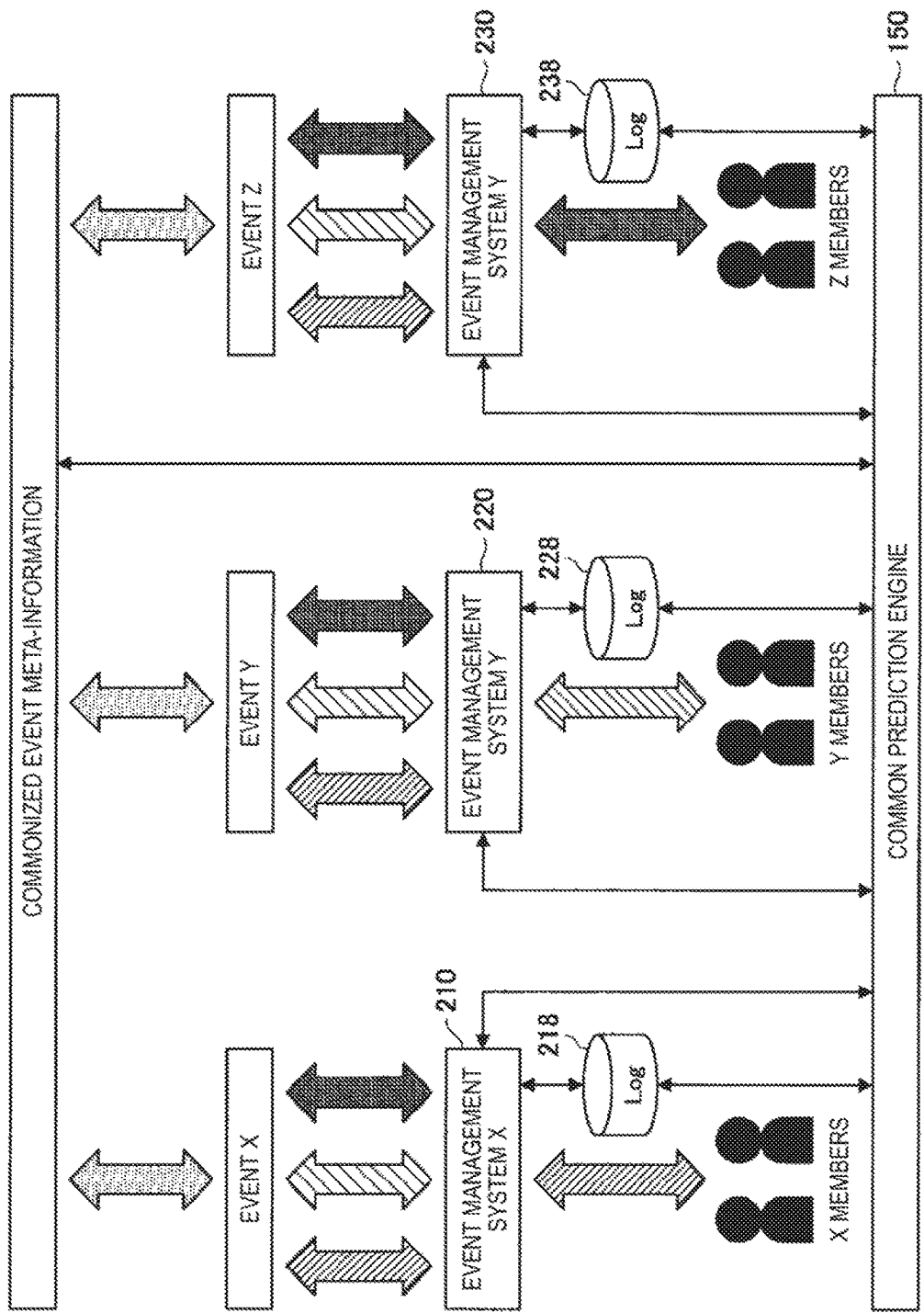
FIG. 2 is an illustrative diagram for describing an overview of a system according to a first embodiment of the present disclosure.

An overview of a system according to the first embodiment of the present disclosure will be described with reference to FIG. 2. FIG. 2 is an illustrative diagram for describing an overview of the system according to the first embodiment of the present disclosure. A more detailed configuration of the system according to the first embodiment will be described in detail again in the following description (2-2. Configuration of system).

Referring to FIG. 2, in a system 1 according to the first embodiment, the event X is managed by the event management system X210, and the event Y is managed by the event management system Y220, and the event Z is managed by the event management system Z230. The event management system X210 has the log 218 in which the purchase history information of the X members is accumulated, the event management system Y220 has the log 228 in which the purchase history information of the Y members is accumulated, and event management system Z230 has the log 238 in which the purchase history information of the Z members is accumulated. Here, since the event management system X210, the event management system Y220, the event management system Z230, and the logs 218, 228, and 238 have similar functions as those of the configurations shown in FIG. 1, detailed description thereof will not be repeated.

The system 1 retains commonized event meta-information obtained by converting event meta-information on the event X, event meta-information on the event Y, and event meta-information on the event Z into a common schema. The event meta-information on each event is managed by the same schema as the commonized event meta-information, and thus, the system 1 is capable of collectively managing events which have been originally respectively managed by respective management systems. Accordingly, the system 1 is capable of determining whether events which have been originally managed by different management systems are the same events or not.

Although not shown, in the system 1, similarly, member profile information managed by the respective management systems is converted into a common schema, and is retained as commonized member profile information. Furthermore, in the system 1, similarly, vacancy information (unsold seats of an event, in other words, information indicating a ticket sales status) managed by the respective management system is converted into a common schema, and is retained as commonized vacancy information.

In the system 1, since the commonized member profile information is retained, the member profile information (for example, user IDs) managed by the respective management systems is shared. Here, even though the user IDs in the respective management systems are shared, since the user IDs are different from each other in the respective management systems, in the first embodiment, it is not possible to determine whether members indicated by the user IDs are the same users.

In the system 1, since the commonized vacancy information is retained, the vacancy information on each event is shared. Hereinafter, a variety of information which is converted into common schemas, such as commonized event meta-information, commonized member profile information, or commonized vacancy information, is generally referred to as common information.

Here, in the system 1, the respective management systems do not individually have their own prediction engines, and instead, a common prediction engine 150 capable of accessing the respective management systems in a crossing manner is provided. The common prediction engine 150 is configured to be capable of accessing the event management system X210, the event management system X220, the event management system Z220, and the logs 218, 228, and 238, and to be capable of accessing commonized information. The common prediction engine 150 has a function for determining combinations of content to be recommended and users based on commonized information and purchase history information in the log 218, 228, and 238.

Here, by accessing commonized event meta-information, the common prediction engine 150 is capable of collectively handling respective events managed by the respective management systems by a common schema. Furthermore, by accessing commonized member profile information, the common prediction engine 150 is capable of collectively handling respective members managed by the respective management system by a common schema. In this way, originally, the common prediction engine 150 is capable of comprehensively handle events and members which are respectively and individually managed by the respective management systems.

Accordingly, the common prediction engine 150 is capable of identifying, in determining combinations of content to be recommended and users with reference to the logs 218, 228, and 238, the same event in the purchase history information in the logs 218, 228, and 238, and is capable of combining and using the purchase history information. Accordingly, the common prediction engine 150 is capable of determining combinations of content to be recommended and users based on a larger amount of purchase history information, and thus, it is possible to predict user's preference or interest with higher accuracy, and to recommend an event which each user is interested in to the user more accurately.

In addition, using the commonized event meta-information and the commonized member profile information, the common prediction engine 150 is capable of recommending an event managed by a certain management system to a member of another management system. For example, the common prediction engine 150 is capable of selecting a Y member managed by the event management system Y220 as a user to whom the event X managed by the event management system X210 is to be recommended. In this way, in the system 1, since targets to which an event is to be recommended are increased compared with the general system 4, it is possible to encourage more users to purchase an event.

Furthermore, the system 1 is capable of converting the commonized event meta-information into a schema in each management system again. Thus, it is possible to use ticket sales systems in respective management systems in a crossing manner. For example, by converting the commonized event meta-information about the event X which is originally managed by the event management system X into a schema of the event management system Y220 again, it is possible to manage the event X by the event management system Y220. Thus, even when the event X managed by the event management system X210 is recommended to the Y members, it is not necessary to register the Y members of the event management system X210 as members on purpose. The Y members can purchase tickets of the event X through the event management system Y220. In this way, according to the first embodiment, a ticket sales method which is higher in the degree of freedom and is more convenient for users is realized.

Hereinbefore, the overview of the system 1 according to the first embodiment has been described with reference to FIG. 2. As described above, in the first embodiment, events which are respectively managed by a plurality of different management systems are managed by a common schema using commonized event meta-information. Accordingly, a ticket purchase method capable of collectively handling events managed by respective management systems, and enhancing the accuracy of event purchase and convenience for users is realized.

2-2. Configuration of System

Figure 3:
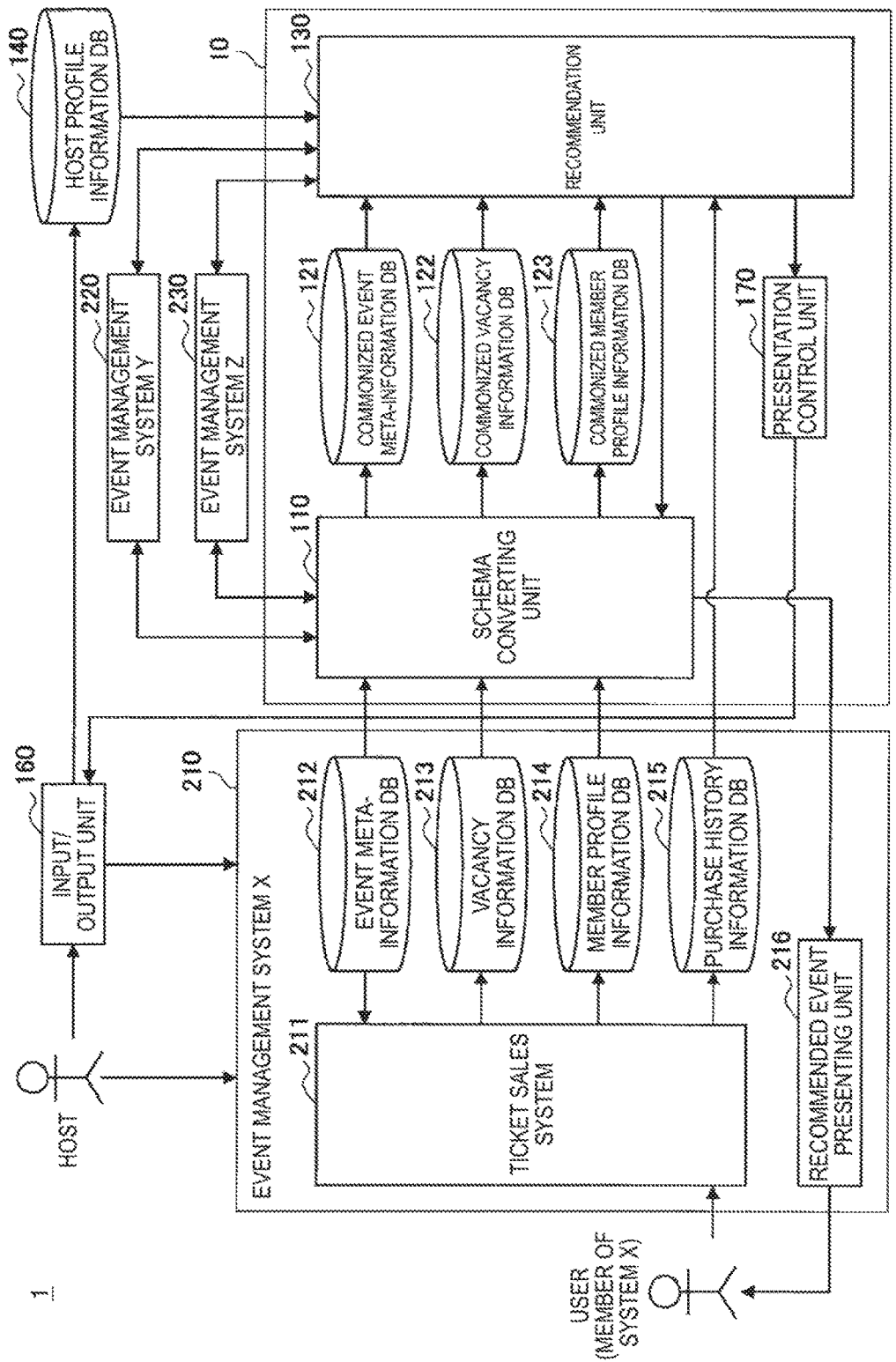
FIG. 3 is a block diagram illustrating an exemplary configuration of the system according to the first embodiment.
Figure 4:
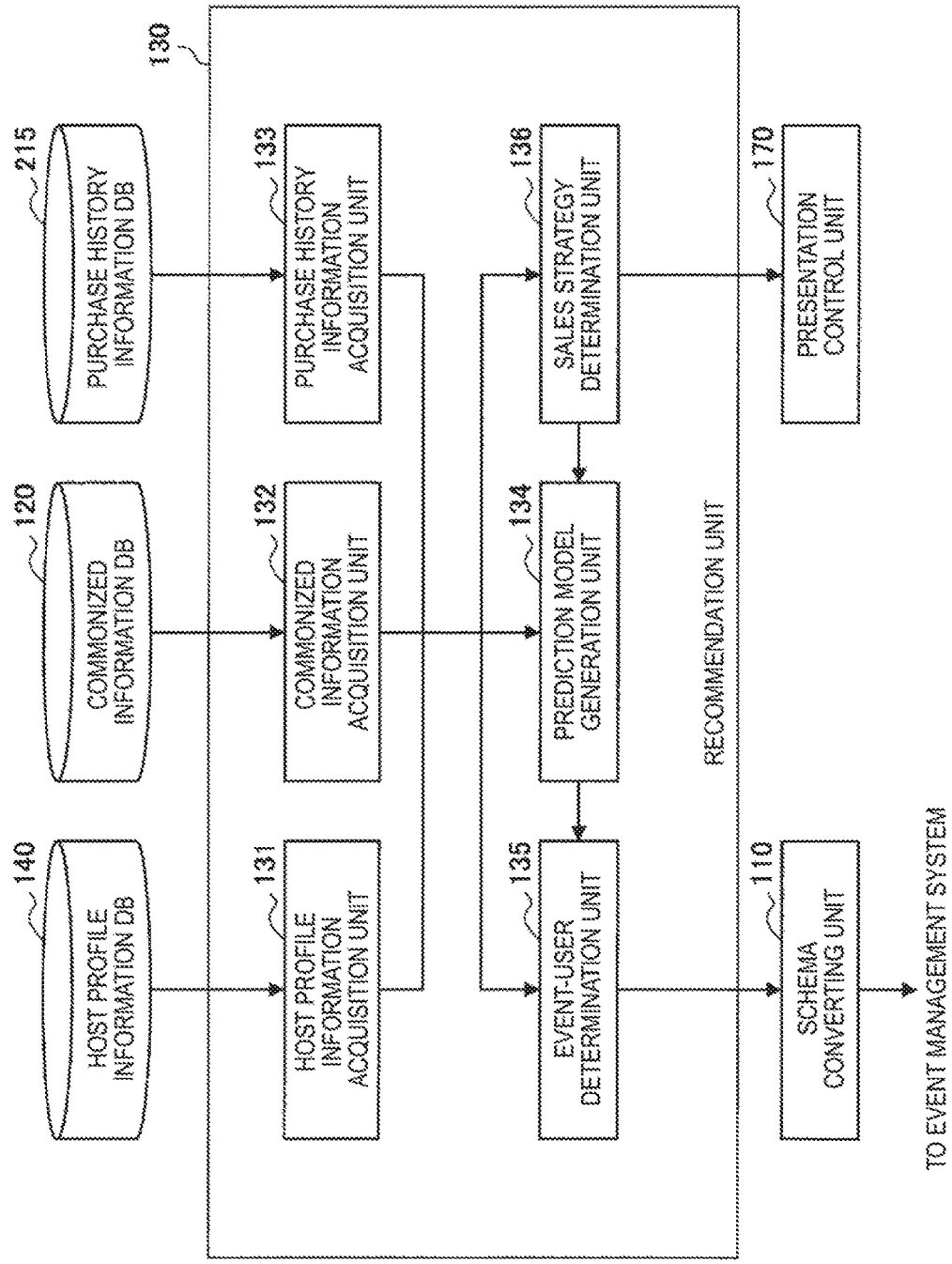
FIG. 4 is a functional block diagram illustrating an exemplary functional configuration of a recommendation unit shown in FIG. 3.

A configuration of the system 1 according to the first embodiment described above will be described in detail with reference to FIGS. 3 and 4. FIG. 3 is a block diagram illustrating an exemplary configuration of the system 1 according to the first embodiment. FIG. 4 is a functional block diagram illustrating an exemplary functional configuration of the recommendation unit 130 shown in FIG. 3.

Referring to FIG. 3, the system 1 according to the first embodiment includes an information processing device 10, an event management system X210, an event management system Y220, an event management system Z230, and a host profile information DB 140, and an input/output unit 160. Here, the event management system X210, the event management system Y220, and the event management system Z230 correspond to the event management system X210, the event management system Y220, and the event management system Z230 shown in FIG. 2, respectively.

In FIG. 3, a case in which a user who is a member of the event management system X210 is given a recommendation of an event through the event management system X210 and purchases a ticket of the event through the event management system X210 is described as an example. Here, the first embodiment is not limited to such an example, and similar process may also be performed with respect to members of the event management system Y220. Further, similar process may also be performed with respect to members of the event management system Z230. In addition, the number of event management systems that form the system 1 is not limited to the example, and the system 1 may be configured by any number of event management systems.

(Input/Output Unit 160)

The input/output unit 160 is an input/output interface between the system 1 and a host of the event. The host may input a variety of information to the system 1 through the input/output unit 160. The system 1 is capable of outputting (presenting) a variety of information to the host through the input/output unit 160. The input/output unit 160 may be a device having an information input/output function carried by the host, such as a personal computer (PC), a smartphone, or a tablet terminal.

For example, the host inputs host profile information (which will be described later) through the input/output unit 160. The input host profile information is stored in the host profile information DB 140. In addition, for example, the host inputs event meta-information to the event management systems X210 through the input/output unit 160. The input event meta-information is stored in an event meta-information DB 212 of the event management systems X210 (which will be described later). An example of an input screen of the event meta-information in the input/output unit 160 will be described in detail in the following description (2-4. Display example).

Furthermore, the input/output unit 160 is capable of presenting a variety of information such as a ticket sales situation of an event, analysis data of previous ticket sales records, or a ticket sales strategy. Further, the information presentation function of the input/output unit 160 may be controlled by a presentation control unit 170 of the information processing device 10 (which will be described later).

The input/output unit 160 may not be necessarily configured by a device different from the information processing device 10, and may be integrally provided with the information processing device 10. In this case, the input/output unit 160 may be configured by an input device (for example, a mouse, a keyboard, a touch panel, or the like) and an output device (a display, a speaker, or the like) provided in the information processing device 10.

(Host Profile Information DB 140)

The host profile information DB 140 refers to a database (DB) in which host profile information which is information about a host of an event is stored. For example, the host profile information includes a host ID for identifying a host or the like, an event ID, sales strategy information indicating a host's sales strategy for each event, and information indicating a schedule or an occurrence of a cast member of each event. Here, the sales strategy information includes information indicating the presence or absence of promotion of each event, a promotion method, a promotion time, the presence or absence of discount of a ticket price and a discount rate, the presence or absence of privilege for a participant of an event and details of the privilege, and the like, for example. The presence or absence of discount of the ticket price and the discount rate may be set to change according to a remaining period of a ticket sales period and a remaining number of tickets. Furthermore, as the content of the privilege, for example, handshake tickets, autograph session participation tickets, related goods presentation, dressing room visit, download rights of premium content using augmented reality (AR), or the like may be considered.

The host profile information is registered in the host profile information DB 140 for each event by a host. In the first embodiment, a sales strategy may be determined by the recommendation unit 130 to be described later based on commonized event meta-information or the like. The host may appropriately correct the sales strategy information determined by the recommendation unit 130 to create sales strategy information to be registered in the host profile information DB 140.

Here, as will be described later, the information processing device 10 of the system 1 may have a function for determining a sales strategy of an event based on commonized event meta-information, and purchase history information in each management system. In the first embodiment, the sales strategy determined by the information processing device 10 may be presented to a host through the input/output unit 160. The host may input sales strategy information through the input/output unit 160 with reference to the presented content. The sales strategy determination function in the information processing device 10 will be described in detail with reference to FIG. 4.

The host profile information DB 140, an event meta-information DB 212, a vacancy information DB 213, a member profile information DB 214, a purchase history information DB 215, a commonized event meta-information DB 121, a commonized vacancy information DB 122, and a commonized member profile information DB 123 which will be described later are exemplary forms of storage units that stores a variety of information, for example, configured by a variety of storage devices such as a magnetic storage device such as a hard disk drive (HDD), a semiconductor storage device, an optical storage device, or a magneto-optical storage device.

(Event Management System X210)

The event management system X210 includes the ticket sales system 211, the event meta-information DB 212, the vacancy information DB 213, the member profile information DB 214, the purchase history information DB 215, and a recommended event presenting unit 216, as its functions. Further, the event management system X210 may have similar function as in various known management systems which are generally used.

The ticket sales system 211 performs a management of event ticket sales or reservation using information stored in the event meta-information DB 212, the vacancy information DB 213, and the member profile information DB 214. A user who is a member of the event management system X210 may purchase a ticket of a desired event through the ticket sales system 211.

For example, the ticket sales system 211 corresponds to electronic ticket sales through a web site or the like. For example, the ticket sales system 211 displays a screen or a web site for ticket sales on a terminal disposed in a store such as a ticket sales store or a convenience store, or a terminal such as a PC or a smartphone of each user to provide a ticket sales service.

The ticket sales system 211 presents a title of an event, an opening date and time of the event, a venue thereof, a price thereof, or the like to a user based on event meta-information stored in the event meta-information DB 212. Here, the ticket sales system 211 may present a remaining number of tickets or vacancy positions in a venue in the case of an event in which seats can be designated to the user in parallel with reference to vacancy information stored in the vacancy information DB 213.

The ticket sales system 211 performs ticket sales with respect to users who are associated therewith (in the example shown in FIG. 3, X members of the event management system X210) with reference to member profile information stored in the member profile information DB 214. Users who purchase tickets may be managed by user IDs.

The ticket sales system 211 sequentially updates information in the event meta-information DB 212, the vacancy information DB 213, the member profile information DB 214, and the purchase history information DB 215 according to ticket sales situations or the like. For example, event meta-information about an event for which a ticket is purchased and a user ID of a user that purchases the ticket are stored in association in the purchase history information DB 215.

Various known systems which are generally used may be applied as the ticket sales system 211.

The event meta-information DB 212 stores a variety of meta-information about an event to be handled by the ticket sales system 211. For example, the event meta-information includes information about a title of an event, an event ID for identifying the event, an opening date and time, a venue, content of the event, a cast member, a price, and the like. Furthermore, the event meta-information may include information about a public release start date and time of event opening information, ticket reservation start and end times and dates, ticket sales start and end times and dates, and the like. The event meta-information may include a variety of information which can be generally used as information relevant to an event in a ticket sales system, for example. The event meta-information in the event meta-information DB 212 is registered in the event management system X210 through the input/output unit 160 for each event by a host of the event.

Hereinafter, information that may be included in the event meta-information will be described in detail.

For example, the event meta-information includes, as information about content of an event, information relevant to progress or production of each event such as a time table, the order of appearance of cast members, a scheduled appearance time of the cast members, a set list, or movement of lighting or a set.

For example, the event meta-information includes, as venue information relevant to a venue of an event, information about the type of the venue, the size thereof, arrangement of the seats, the types of the seats (S seat, A seat, standing space, non-smoking seat, smoking seat, or the like), an interval of the seats, a specification of the seats (for example, shape, size, material, or the like), surrounding environments of the seats (for example, doorway, passage, air-conditioning equipment position, or the like). Furthermore, for example, the venue information includes information relevant to equipment or setting of each event venue, such as positions and specifications of an area (event area) where an event is performed in a venue, a set, musical instruments, a lectern, a moderator stand, lighting, sound equipment, or machines. Further, for example, when setting of a venue changes in a time-series manner, the venue information also includes information about the change of the setting.

For example, in the case of an event in which a video obtained by imaging the event is delivered to each user, that is, an event in which each user does not directly go to a venue, the event meta-information includes a variety of information necessary when an event is delivered, such as a relationship between a virtual seat of a user and how an event area looks like in the video to be delivered.

Furthermore, for example, the event meta-information includes information about physical features (for example, height, body type, or the like) of a cast member of an event, features of movement or performance of the cast member, and clothing of the cast member, as the information relevant to the cast member.

Further, in the present specification, the cast member includes a person, an animal, or the like which is viewed in an event. For example, a player of a sport, an animal of a circus, or the like is also included in the cast member.

Also, the event information is created and retained for each event of each time, when the same event is performed consecutively at the same venue, for example, in the case of an event of two stages in day and night, an event that is performed on consecutive days at the same venue, or the like. Also, the venue information is created and retained for each venue, with respect to an event dispersedly performed at a plurality of venues, such as live viewing, for example.

The vacancy information DB 213 stores vacancy information about vacancies of an event handled by the ticket sales system 211. For example, the vacancy information includes information about a venue ID indicating a venue, a seat ID indicating a seat in the venue, and a position in the venue of the seat indicated by the seat ID, for example. The vacancy information is generated based on event meta-information by the ticket sales system 211, and content thereof is updated according to ticket sales situations. It can be said that the vacancy information is information indicating ticket sales situations. The vacancy information may include a variety of information which can be used as information indicating vacancies in an event in a general ticket sales system, for example The member profile information DB 214 stores member profile information about members registered in the ticket sales system 211. For example, the member profile information includes information about a user ID indicating a user, a gender, an age, a nationality, an address, an occupation and a credit card number of the user, and the like.

The member profile information includes physical features of a user, such as a height, a sitting height, a body type, vision, the presence or absence of use of a wheelchair, or the like, for example.

Further, the member profile information includes preference information relevant to a preference of a user, for example. For example, the preference information includes user's preference information relevant to an event (including a cast member), such as a favorite artist, a member of a favorite group, a favorite team, a favorite player, the type of a favorite event, a favorite genre, a favorite or skilled musical instrument, and a favorite stage set. Also, for example, the preference information includes user's preference information relevant to a venue and a seat, such as a favorite venue, the position of a favorite seat, an angle for viewing a favorite event region, the type of a favorite seat, and a specification of a favorite seat.

In addition, the member profile information includes behavior tendency information relevant to a behavior tendency when a user purchases a ticket, for example. The user's behavior tendency refers to a behavior tendency when a user purchases a ticket, such as a strong tendency to buy a ticket immediately after ticket sales is started (pre-purchase type) or a strong tendency to buy a ticket immediately before an opening day of an event (just-before-purchase type). The user's behavior tendency will be described later in detail with reference to FIGS. 5(a) and 5(b).

The above-described preference information or the behavior tendency information can be acquired by analyzing purchase history information, for example. The analysis process may be performed by the ticket sales system 211, or may be performed by another configuration (for example, the recommendation unit 130 of the information processing device 10 (which will be described later)).

Also, the member profile information includes viewing attitude feature information indicating a feature of how a user views an event, for example. The viewing attitude feature information includes information such as fussing, singing, dancing, moving violently, laughing, crying, hitting hands, viewing quietly, sitting and viewing, standing and viewing, sleeping, cheering, raising a strange voice, jeering, muttering, speaking with surrounding, cosplaying, using goods for cheer, jiggling legs nervously, drinking alcohol, leaving a seat frequently, joining late, or going home in the middle, for example.

Further, the viewing attitude feature information may not include only an actual feature of a user, but a user's desire such as wanting to fuss, wanting to sing, or wanting to dance. Also, the viewing attitude feature information of each user may be dividedly held for each event type or each cast member, in consideration of how a user views an event is different for each event type or each cast member.

Also, the viewing attitude feature information may be created on the basis of an answer to a questionnaire from each user, or may be created on the basis of an analysis result of a video, an image, or a voice in the vicinity of a seat of each user during an event, for example. Also, for example, information relevant to a feature of how a user views may be extracted by analyzing a text of a post or the like, on social media relevant to an event, of a user himself or herself and an audience of seats surrounding a user, and may be and reflected in the viewing attitude feature information.

The member profile information may include a variety of information which can be used as information about members of a general ticket sales system.

The purchase history information DB 215 stores purchase history information about each member registered in the ticket sales system 211. For example, the purchase history information DB 215 stores information about a user ID, the number of times of purchase, venues of an event related to a purchased ticket, the type and position of a seat, the type of the event (for example, movie, theater, concert, sport, or the like), cast members of the event, in association. In addition, the purchase history information may include information indicating a purchase pattern of each user such as repetitive purchase of tickets of the same type of events (for example, concerts of the same artist, or the like), purchase of tickets of a wide range of genres, or rare purchase of tickets, for example. Further, the purchase history information may include information about events recommended to a user and a user's behavior for the event (whether the user bought a ticket of the event). In addition, the purchase history information may include information about a ticket purchase time in a sales period. Furthermore, a history of each user such as viewing information relevant to an event or addition of a book mark for checking ticket purchase, in addition to the ticket purchase, may be included in the purchase history information.

The above-described preference information or behavior tendency information may be extracted based on the information included in the purchase history information. In this way, the member profile information may be updated based on the purchase history information. Further, the information stored in the purchase history information DB 215 is not limited to such an example, and the purchase history information DB 215 may store a variety of information capable of being stored as purchase history information of members in a general ticket sales system.

The recommended event presenting unit 216 presents an event to be recommended to a user (a member of the event management system X in the example shown in FIG. 3) determined by the recommendation unit 130 of the information processing device 10 (which will be described later), to thereby perform promotion of the event to the user. For example, the recommended event presenting unit 216 displays an advertisement of an event on a ticket sales screen or the like of the ticket sales system 211 as a recommended event to the user. Furthermore, for example, the recommended event presenting unit 216 delivers information about the event to the user through an e-mail or the like as the recommended event to the user. The recommended event presenting unit 216 is configured by various processors such as a central processing unit (CPU) or a digital signal processor (DSP), for example, and a function of the recommended event presenting unit 216 may be realized as the processor is operated according to a predetermined program.

(Information Processing Device 10)

The information processing device 10 includes a schema converting unit 110, a commonized event meta-information DB 121, a commonized vacancy information DB 122, a commonized member profile information DB 123, a recommendation unit 130, and a presentation control unit 170, as its functions. The schema converting unit 110, the recommendation unit 130, and the presentation control unit 170 are configured by various processors such as a CPU or a DSP, for example, and functions of the schema converting unit 110, the recommendation unit 130, and the presentation control unit 170 may be realized as the processor is operated according to a predetermined program.

The presentation control unit 170 controls presentation of information in the input/output unit 160 which is an interface through which a host performs input and output of a variety of information with respect to the system 1. The presentation control unit 170 displays a variety of information on the input/output unit 160, to thereby present the information to the host. For example, the presentation control unit 170 presents information about a sales strategy of an event determined by the recommendation unit 130 to the host through the input/output unit 160. The presentation control unit 170 may present a variety of information desired by the host, such as an event ticket sales situation or previous ticket sales record analysis data, to the host through the input/output unit 160.

The schema converting unit 110 converts information stored in the event meta-information DB 212, the vacancy information DB 213, and the member profile information DB 214 into common schemas. Specifically, the schema converting unit 110 converts the information stored in the event meta-information DB 212, the vacancy information DB 213, and the member profile information DB 214 to be managed in a common ID system. As described in (1. General system), generally, if management systems that manage events are different from each other, schemas of managed information are different from each other. In the first embodiment, the information managed by the different management systems are converted into the common schemas by the schema converting unit 110, so that the information can be collectively managed.

Event meta-information in the event meta-information DB 212 which is schema-converted by the schema converting unit 110 is stored in the commonized event meta-information DB 121 as commonized event meta-information. Vacancy information in the vacancy information DB 213 which is schema-converted by the schema converting unit 110 is stored in the commonized vacancy information DB 122 as commonized vacancy information. Member profile information in the member profile information DB 214 which is schema-converted by the schema converting unit 110 is stored in the commonized member profile information DB 123 as commonized member profile information.

The commonized event meta-information DB 121 stores the event meta-information (commonized event meta-information) converted into the common schema. For example, the commonized event meta-information includes a part or the entirety of information about items such as a title of an event, a cast member of the event, a genre of the event, a venue where the event is held, a date and time relevant to the event (an opening date and time, a public release start date and time of event opening information, reservation start and end dates and times, ticket sales start and end dates and times, or the like), a ticket price (a ticket price, an admission fee, or the like), content of the event (summary text, event introduction image or video, review of cast members or event, URL of a web site in which detailed description about the event is written, or the like). Here, for example, the information about the cast members, the information about the genre of the event, and the information about the venue where the event is held are respectively managed by common IDs (commonized cast member ID, commonized genre ID, and commonized venue ID). Furthermore, other information is also managed in a common format. In this way, the event meta-information originally registered in different schemas in different management systems is stored in the commonized event meta-information DB 121 as a common schema.

The commonized vacancy information DB 122 stores vacancy information (common vacancy information) which is converted into a common schema (commonized vacancy information). For example, the commonized vacancy information includes vacancy information about an event (for example, information about seat types of remaining seats, seat numbers, prices, or the like).

The commonized member profile information DB 123 stores member profile information which is converted into a common schema (commonized member profile information). The commonized member profile information includes information about user IDs, for example. Thus, the user IDs managed by respective management systems are shared. Here, even though the user IDs in the respective management systems are commonized, since the user IDs are different from each other in the respective management systems, in the first embodiment, it is difficult to determine whether members indicated by the user IDs are the same users. Furthermore, the commonized member profile information may include the above-described preference information, tendency information, and viewing attitude feature information.

The recommendation unit 130 determines combinations of content to be recommended and users based on the commonized event meta-information and the purchase history information in the respective management systems. In other words, the recommendation unit 130 selects a user to whom an event is to be recommended or an event to be recommended to a user based on the common event meta-information and the purchase history information in the respective management systems. The recommendation unit 130 has a function corresponding to the common prediction engine 150 shown in FIG. 2.

Specifically, the recommendation unit 130 associates the purchase history information in the purchase history information DB 215 of each management system with the commonized event meta-information, to thereby generate a prediction model for selecting combinations of an event to be recommended and users, comprehensively using the purchase history information in the respective management systems. The recommendation unit 130 determines the combination of the event to be recommended and the users based on the generated prediction model.

The recommendation unit 130 transmits information about the determined combinations of the event and the users to a recommended event presenting unit of a management system in which the users of the determined combinations are registered as members. In the example shown in FIG. 3, a case in which the users of the determined combinations are members of the event management system X210 and the information about the determined combinations of the event and the users is transmitted to the recommended event presenting unit 216 of the event management system X210 is shown.

The recommended event presenting unit 216 presents a selected event to a selected user. For example, the recommended event presenting unit 216 displays information about the selected event in a recommendation section or an advertisement section of a ticket purchase screen (for example, a ticket purchase screen or the like in a state in which the user is logged in) associated with the selected user.

Here, the combinations of the event and the users determined by the recommendation unit 130 are represented by the commonized event meta-information and the commonized user IDs, for example. Accordingly, when the information about the combinations of the event and the users is transmitted to the recommended event presenting unit 216 from the recommendation unit 130, the information is converted into a schema of a management system (in the example of FIG. 3, the event management system X210) which is a presentation target. Thus, in the recommended event presenting unit 216 of the event management system X210, it is possible to handle the event meta-information and the user IDs in the schema of the original event management system X210.

In the first embodiment, an event presented to members of the event management system X210 may not necessarily be an event managed by the event management system X210. In this way, in the first embodiment, since event meta-information is collectively managed as commonized event meta-information, it is possible to present an event managed by one management system to members of other management systems.

Furthermore, the recommendation unit 130 may have a function for determining a sales strategy of an event based on commonized event meta-information and purchase history information in each management system. The information about the determined sales strategy is provided to the presentation control unit 170, and is presented to a host by the presentation control unit 170 through the input/output unit 160.

Next, a functional configuration of the recommendation unit 130 will be described in detail with reference to FIG. 4. Referring to FIG. 4, the recommendation unit 130 includes a host profile information acquisition unit 131, a commonized information acquisition unit 132, a purchase history information acquisition unit 133, a prediction model generation unit 134, an event-user determination unit 135, and a sales strategy determination unit 136, as its functions. Here, for ease of description, in FIG. 4, as a configuration that performs transmission and reception of information with the recommendation unit 130, the host profile information DB 140, the commonized information DB 120, the purchase history information DB 215, the schema converting unit 110, and the presentation control unit 170 are shown in addition. The commonized information DB 120 is shown as a single block that generally represents the commonized event meta-information DB 121, the commonized vacancy information DB 122, and the commonized member profile information DB 123 shown in FIG. 3, for simplification of drawings.

The host profile information acquisition unit 131 acquires host profile information from the host profile information DB 140. The host profile information acquisition unit 131 provides the acquired host profile information to the prediction model generation unit 134, the event-user determination unit 135, and the sales strategy determination unit 136.

The commonized information acquisition unit 132 acquires commonized information from the commonized information DB 120. The commonized information acquisition unit 132 provides the acquired commonized information to the prediction model generation unit 134, the event-user determination unit 135, and the sales strategy determination unit 136.

The purchase history information acquisition unit 133 acquires purchase history information from the purchase history information DB 215. The purchase history information acquisition unit 133 provides the acquired purchase history information to the prediction model generation unit 134, the event-user determination unit 135, and the sales strategy determination unit 136. In FIG. 4, only one purchase history information DB 215 (for example, the purchase history information DB 215 of the event management system X210 shown in FIG. 3) is shown, but the purchase history information acquisition unit 133 similarly acquires purchase history information from the purchase history information DB 215 of the event management system Y220 and the event management system Z230.

The sales strategy determination unit 136 determines a sales strategy of an event based on commonized event meta-information and purchase history information in the respective management systems. The sales strategy determined by the sales strategy determination unit 136 may include various items mentioned in the above description of the host profile information DB 140.

Here, in the first embodiment, the sales strategy determination unit 136 preferably determines a promotion strategy (advertisement strategy) according to a ticket sales period and an amount for for sale. The promotion strategy includes information about the amount of promotion of an event according to a ticket sales period and the amount for sale, a promotion time of the event according to the sales period and the amount for sale, an attribute of a user who is a promotion target of the event according to the sales period and the amount for sale, or cost performance of the promotion of the event according to the sales period and the amount for sale, for example. Since the ticket sales period and the number of tickets for sale are limited in an event which is quantitative merchandise, by setting a delicate promotion strategy according to the sales period or the amount for sale, it is possible to achieve more accurate promotion.

For example, the sales strategy determination unit 136 may determine the above-described promotion strategy based on information about types of events included in commonized event meta-information, information about previous ticket sales records included in purchase history information, or the like. For example, in many cases, a music-based event is a one-time event or an event having a small number of performances, and tickets of the event are generally sold out in advance. Accordingly, it is preferable that a lot of promotion is performed at a time close to a ticket sales start date and time. On the other hand, in many cases, a theatrical event is repeatedly held within a predetermined period of time, and tickets of the event are generally remained even immediately before its opening. Accordingly, in the theatrical event, it is preferable that a lot of promotion is performed in both periods of time, in other words, in a period of time close to a ticket sales start date and time and a period of time close to an opening date and time of the event. In this way, according to the types of events, in a case in which an apparent tendency appears in a period of time when tickets are purchased, a period of promotion may be determined in consideration of the tendency.

Further, for example, the sales strategy determination unit 136 may determine a promotion strategy so as to perform promotion with respect to many users in a period of time close to a ticket sales start date and time, and to perform promotion with respect to users who are presumed to be interested in the event as a ticket sales end date and time comes near. In a period of time close to a ticket sales end date and time, in order to decrease the number unsold tickets to the minimum, it is considered that it is effective to perform promotion focusing on users who are highly likely to buy the tickets.

Furthermore, for example, the sales strategy determination unit 136 may calculate a probability that tickets are purchased by promotion based on a remaining period of time of a ticket sales period of time, the number of unsold tickets, the number of users who are presumed to be interested in the event, the degrees of interest of such users, and the like, and may calculate cost performance of the promotion. If the cost performance is shown to a host, the host may use the result as a guide in determining a time when the host performs promotion or the amount of promotion.

Further, for example, the sales strategy determination unit 136 may determine a promotion strategy based on user's behavior tendency information included in commonized member profile information.

Here, a sales strategy determination process based on the above-mentioned user's behavior tendency information will be described in detail with reference to FIGS. 5(*a*) and 5(*b*). FIGS. 5(*a*) and 5(*b*) are an illustrative diagrams for describing a sales strategy determination process based on user's behavior tendency information.

In FIGS. 5(*a*) and 5(*b*), a horizontal axis represents time, a vertical axis represents a probability that a user purchases a ticket, in which a temporal change in the user's purchase probability is schematically shown. Further, purchase probability distributions shown in FIGS. 5(a) and 5(b) may be obtained by expressing ticket purchase records of users as histograms and estimating appropriate probability distributions based on characteristics of the histograms such as Gaussian distributions, based on the histograms.

In FIG. 5, a horizontal axis represents time, a vertical axis represents a probability that a user purchases a ticket, in which a temporal change in the user's purchase probability is schematically shown. Further, purchase probability distributions shown in FIG. 5 may be obtained by expressing ticket purchase records of users as histograms and estimating appropriate probability distributions based on characteristics of the histograms such as Gaussian distributions, based on the histograms.

FIG. 5(a) illustrates an exemplary purchase probability distribution of a user 1 of a pre-purchase type. There is a high probability that the user 1 purchases a ticket immediately after a ticket sales start date and time. Accordingly, there is a high probability that the user 1 checks information about an event which the user is interested in before the ticket sales start date and time. Accordingly, the sales strategy determination unit 136 appropriately determines a sales strategy so as to perform promotion of an event before the ticket sales start date and time, with respect to the user 1.

On the other hand, FIG. 5(b) illustrates an exemplary purchase probability distribution of a user 2 of a just-before-purchase type. There is a high probability that the user 2 purchases a ticket immediately before an opening day of an event. Accordingly, even though promotion of the event is performed before a ticket sales start time with respect to the user 2, it is considered that its effect is small. Accordingly, the sales strategy determination unit 136 appropriately determines a sales strategy so as to perform promotion of an event after a certain period of time elapses from a ticket sales start day with respect to the user 2.

In this way, by determining a sales strategy based on user's behavior tendency information, it is possible to perform promotion of an event at an appropriate timing.

The sales strategy determination unit 136 provides information about the determined sales strategy to the presentation control unit 170. The information about the sales strategy is presented to a host by the presentation control unit 170. The host may determine a final sales strategy with reference to the presented information, and may input the result to the host profile information DB 140 as host profile information. The presentation control unit 170 may cause the input/output unit 160 to display a setting screen such that the host can correct the sales strategy determined by the sales strategy determination unit 136 more easily and more intuitively, for example.

The sales strategy determination unit 136 may determine a plurality of sales strategies, and the plurality of sales strategies may be presented to a host by the presentation control unit 170. In this case, the host may select a sales strategy most suitable for a host's intention from the presented sales strategies candidates.

The prediction model generation unit 134 generates a prediction model for selecting combinations of an event to be recommended and users, based on commonized event meta-information and purchase history information. Specifically, the prediction model generation unit 134 associates the purchase history information in the purchase history information DB 215 of each management system with the commonized event meta-information. Through the association process, the purchase history information in a plurality of different management systems is collectively handled in association with the commonized event meta-information. The recommendation unit 130 generates a prediction model for selecting combinations of an event to be recommended and users based on the purchase history information associated with the commonized event meta-information. Since the prediction model is generated by comprehensively using the purchase history information in the plurality of different management systems, it can be said that the accuracy of prediction is excellent compared with a prediction model generated using purchase history information in one management system.

Here, known various prediction models may be used as the prediction model. For example, the prediction model may be a cooperative filtering model. In the cooperative filtering model, an event which a target user is considered to be interested in is predicted using another user's purchase history information having a similar preference. In a case in which the prediction model is the cooperative filtering model, a feature amount indicating the degree of cooperation may be calculated using the commonized event meta-information associated with the purchase history information.

For example, the prediction model may employ a method using vector matching. In this method, commonized event meta-information included in the user's purchase history information is vectorized, and weights a frequency for each feature amount. Thus, a user vector indicating a target which a user is interested in may be generated. Furthermore, vector matching between a vector indicating a feature amount of a certain event, obtained from commonized event meta-information about the event, and a user vector obtained from user's purchase history information is performed, and a distance therebetween is calculated using a cosine distance, an Euclidean distance, or the like. It can be said that a user for which the distance is shorter is a user who is interested in the event.

The prediction model generation unit 134 may generate the prediction model further based on behavior tendency information, preference information, or viewing attitude feature information included in commonized member profile information. Thus, it is possible to generate a prediction model in which a user's character is additionally reflected. Furthermore, the prediction model generation unit 134 may generate the prediction model further based on sale strategy information included in host profile information. The sales strategy information may be information which is determined by the sales strategy determination unit 136 and is corrected by a host. Thus, it is possible to generate a prediction model in which a host's ticket sales intention is additionally reflected while taking into account the type of an event or previous sales records. In a case in which there is no instruction of an explicit sales strategy from a host, the prediction model generation unit 134 may generate a prediction model based on the sales strategy determined by the sales strategy determination unit 136.

The prediction model generation unit 134 may generate a prediction model by combination of behavior tendency information and sales strategy information. For example, by recommending an event for which many tickets are intended to be sold immediately after a ticket sales start date and time as a sales strategy with respect to users of the pre-purchase type as shown in FIG. 5(a), it is possible to promote purchase of the tickets of the event. Accordingly, the prediction model generation unit 134 can appropriately generate a prediction model for recommending an event for which a sales strategy for selling many tickets at a time close to a ticket sales start date and time is set with respect to such users. On the other hand, by recommending an event for which many tickets are intended to be sold immediately before the event is held as a sales strategy with respect to users of the just-before-purchase type as shown in FIG. 5(b), it is possible to promote purchase of the tickets of the event. Accordingly, the prediction model generation unit 134 can appropriately generate a prediction model for recommending an event for which a sales strategy for selling many tickets immediately before an opening day is set with respect to such users.

The prediction model generation unit 134 provides the generated prediction model to the event-user determination unit 135.

The event-user determination unit 135 determines combinations of an event to be recommended and users using a prediction model. Specifically, the event-user determination unit 135 performs matching of events and users using the prediction model, and selects a user who is considered to be interested in an event which is a recommendation target (or, contrarily, selects an event which a user who is a recommendation target is considered to be interested in). Since commonized event meta-information and commonized member profile information are acquired as commonized information, the event-user determination unit 135 may perform matching of events and users in a crossing manner by generally considering events and members which are respectively managed by the respective event management systems.

Further, the event-user determination unit 135 may perform matching of events and users in further consideration of seats based on commonized vacancy information. For example, in a case in which a seat preferred by a user is known based on purchase history information or preference information included in commonized member profile information, the event-user determination unit 135 may select an event for which a prediction model is used and in which a seat close to the seat preferred by the user is vacant as an event to be recommended to the user.

In addition, the event-user determination unit 135 may select an event suitable for a user based on other preference information, viewing attitude feature information, information indicating user's physical features, or the like included in the commonized member profile information.

Furthermore, the event-user determination unit 135 may set only members of a management system of a predetermined host ID as matching targets based on a host ID (that is, an ID indicating a management system) included in host profile information. In this way, in the first embodiment, a user who is an event presentation target may be limited only to a member of a certain management system. The setting may be performed by a host when host profile information is registered.

The event-user determination unit 135 provides information about the determined combinations of the event and the users to the schema converting unit 110.

Here, the combinations of the event and the users determined by the event-user determination unit 135 are represented by commonized event meta-information and commonized user IDs, for example. The schema converting unit 110 converts again the commonized event meta-information about the event and the commonized user IDs indicating the users into a schema of an event management system which is a presentation target, based on the information about the combinations of the event and the users. Here, the event management system which is the presentation target refers to a management system in which the users of the determined combinations are registered as members. By performing the schema conversion again, it is possible to handle events and users in a schema of each event management system. In each event management system, for example, promotion of a selected event may be presented to a selected user using the recommended event presenting unit 216 shown in FIG. 3. Furthermore, in each event management system, a ticket of an event presented to a user may be sold according to a user's operation.

Here, in the first embodiment, the event-user determination unit 135 is capable of selecting a member of another management system as a user to whom an event managed in a certain management system is to be recommended. For example, a user who is a member of the event management system X210 may be selected as a user to whom an event Y managed by the event management system Y220 is to be recommended. In this case, the event meta-information about the event Y is converted into commonized event meta-information, and then, is converted into a schema capable of being managed by the event management system X210 again. Thus, it is possible to handle the event Yin the event management system X210. In the first embodiment, event meta-information and member profile information are commonized, and may be comprehensively managed by the information processing device 10, and thus, it is possible to perform matching of users and events between different management systems as described above.

In the first embodiment, by storing an event managed by one management system in a DB of a different management system through schema conversion, it is possible to perform sales tickets of the event by the different management system. For example, in the case of the above-mentioned example, a user who is a member of the event management system X210, to whom the event Y managed by the event management system Y220 is recommended through the event management system X210, can purchase a ticket of the event Y through the event management system X210. Here, the user can watch promotion of the event or can purchase the ticket without recognizing that the event is managed by the different event management system. In this way, according to the first embodiment, it is possible to recommend event or purchase tickets with a high degree of freedom or a high convenience for the user.

Hereinbefore, the configuration of the system 1 according to the first embodiment has been described with reference to FIGS. 3 and 4. As described above, according to the first embodiment, since event meta-information managed by a plurality of different management systems is converted into a common schema, it is possible to comprehensively handle the event meta-information. Accordingly, it is possible to comprehensively handle purchase history information about the plurality of management systems, to thereby enhance the accuracy of a prediction engine. Thus, it is possible to appropriately perform matching of events to be recommended and users. Furthermore, since the event meta-information is commonized, purchase tickets of the event is further promoted, to thereby improve convenience of a host who is a ticket seller, based on the event meta-information.

Furthermore, by converting commonized event meta-information into a schema of each management system again, it is possible to handle an event which is originally managed by one management system in other management systems. In other words, it is possible to mutually use event meta-information between management systems. Accordingly, users who are event recommendation matching targets are enlarged to members of all management systems, and thus, a ticket purchase range is enlarged, and ticket purchase is further promoted.

As described above, since the event meta-information can be mutually used between the respective management systems, it is possible to perform event ticket sales in any management system, to thereby enhance convenience of users who are members.

The configuration of the information processing device 10 is not limited to the examples shown in FIGS. 3 and 4. For example, the respective functions of the information processing device 10 shown in FIGS. 3 and 4 may not be necessarily provided integrally in one device. The information processing device 10 may be configured so that the respective functions mounted in the information processing device 10 shown in FIGS. 3 and 4 are separately mounted in a plurality of devices and the plurality of devices are connected to communicate with each other. For example, each DB may be provided as an external device other than the information processing device 10, and the information processing device 10 may execute the above-described various processes while performing communication with the DBs which are external devices.

In addition, a computer program for realizing the functions of the information processing device 10 according to the above-described first embodiment may be created, and may be mounted in a personal computer or the like. Furthermore, a computer-readable recording medium on which such a computer program is stored may be provided. The recording medium is a magnetic disc, an optical disc, a magneto-optical disc, a flash memory, or the like, for example. The computer program may be delivered through a network, for example, without using the recording medium.

2-3. Information Processing Method

Figure 6:
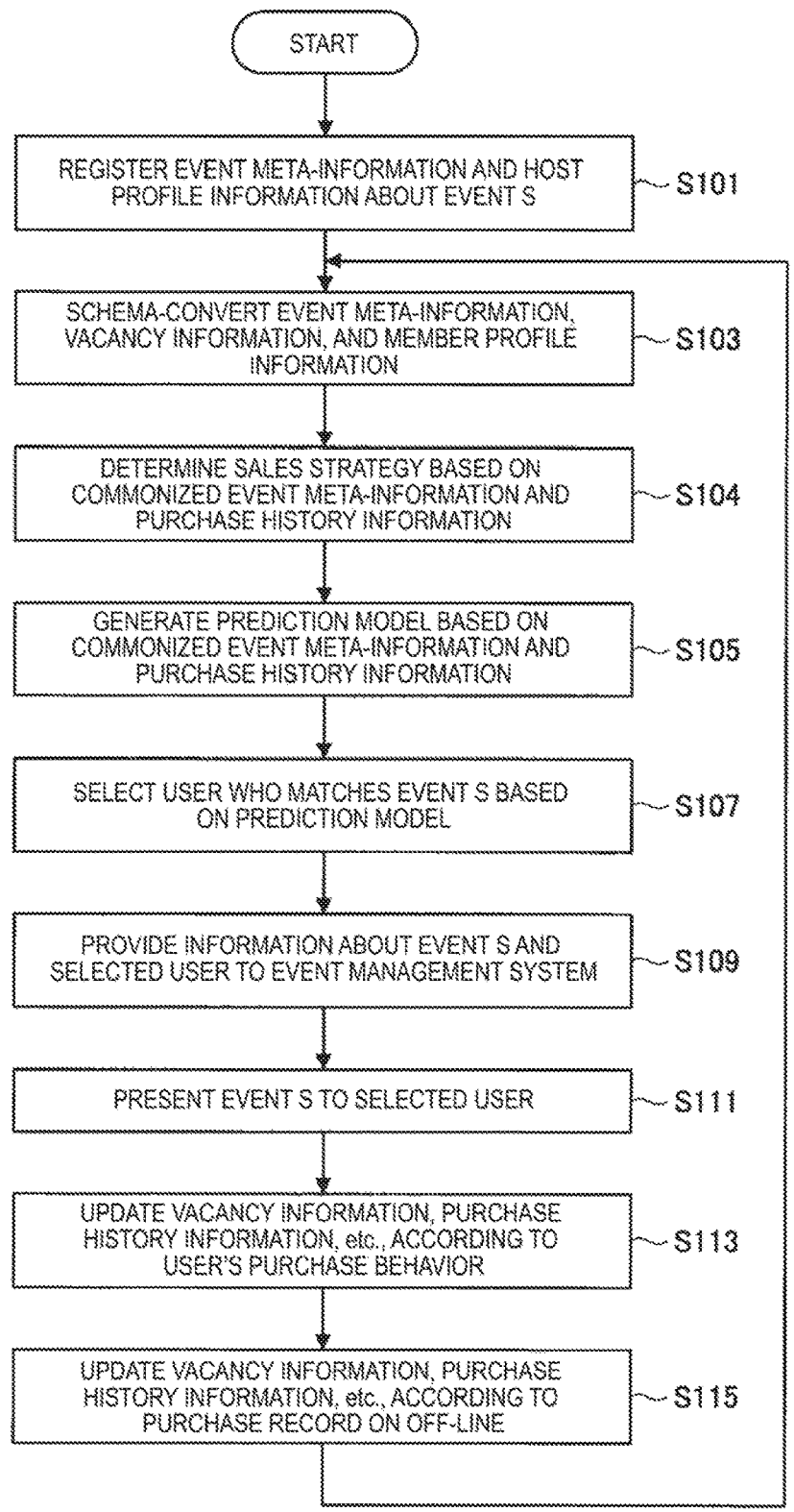
FIG. 6 is a flowchart illustrating an exemplary processing procedure of an information processing method according to the first embodiment.

An information processing method according to the first embodiment, executed in the system 1 shown in FIG. 3, will be described with reference to FIG. 6. FIG. 6 is a flowchart illustrating an exemplary processing procedure of the information processing method according to the first embodiment. Hereinafter, the information processing method will be described with reference to an example in which an event S managed by the event management system X210 is recommended to a user (a member of the event management system X210) in the system 1 shown in FIG. 3.

Referring to FIG. 6, in the information processing method according to the first embodiment, first, event meta-information and host profile information about the event S are registered by a host (step S101). Specifically, in the process shown in step S101, the event meta-information and the host profile information about the event S are stored in the event meta-information DB 212 and the host profile information DB 140 through the input/output unit 160, respectively.

Then, the event meta-information and vacancy information about the event S and the member profile information in the event management system X210 are converted into common schemas (step S103). Specifically, in the process shown in step S103, information stored in the event meta-information DB 212, the vacancy information DB 213, and the member profile information DB 214 of the event management system X210 is converted into the common schemas, so that commonized information (in other words, commonized event meta-information, commonized vacancy information, and commonized member profile information) is generated. Similarly, event meta-information, vacancy information, and member profile information in other management systems are also converted into common schemas.

The process shown in step S103 corresponds to the process performed by the schema converting unit 110 shown in FIG. 3, for example.

Then, a sales strategy is determined based on the commonized event meta-information and purchase history information (step S104). The sales strategy may be determined based on the type of an event, previous sales records of the same type of events, or the like, for example. Although not shown, the determined sales strategy is presented to the host, and a final sales strategy is determined by the host. The process shown in step S104 corresponds to the process performed by the sales strategy determination unit 136 shown in FIG. 4, for example.

Then, a prediction model is generated based on the commonized event meta-information and the purchase history information (step S105). The prediction model refers to a model for predicting a user to whom the event S is to be recommended in consideration of the type of the event, a purchase history of the user, or the like. The process shown in step S105 corresponds to the process performed by the prediction model generation unit 134 shown in FIG. 4, for example.

Then, a user who matches the event S is selected based on the generated prediction model (step S107). The process shown in step S107 corresponds to the process performed by the event-user determination unit 135 shown in FIG. 4, for example. Here, for example, it is assumed that a user who is a member of the event management system X210 is selected.

Then, information about the event S and the selected user is transmitted to the event management system X210 in which the user is registered (step S109). In the process shown in step S109, the transmitted information is converted into a schema corresponding to the event management system X210 which is a transmission destination. The schema conversion process shown in step S107 may be realized by the schema converting unit 110 shown in FIG. 3, for example.

Then, the event S is presented to the selected user (step S111). The process shown in step S111 corresponds to the process performed by the recommended event presenting unit 216 shown in FIG. 3, for example. For example, information about the event S may be displayed as a recommendation event on a ticket purchase screen or the like displayed with respect to a user, or may be displayed in an advertisement area on the ticket purchase screen.

Then, the vacancy information about the event S in the vacancy information DB 213 and the purchase history information in the purchase history information DB 215 are updated according to a user's purchase behavior (step S113). In the process shown in step S113, in addition to a case in which a user views an advertisement of the event S presented in the process shown in step S111 and purchases a ticket of the event S, purchase behaviors of other users may be reflected in the vacancy information in the vacancy information DB 213 and the purchase history information in the purchase history information DB 215.

Then, the vacancy information about the event S in the vacancy information DB 213 and the purchase history information in the purchase history information DB 215 are updated according to an off-line purchase record (step S115). Here, the off-line purchase record refers to a purchase record that cannot be directly detected by the system 1, such as a ticket purchase record at a window of a venue, for example. The process shown in step S115 is performed by the host or the like capable of recognizing off-line ticket sales, for example.

In FIG. 6, the process shown in step S113 and the process shown in step S115 are shown in this order for convenience of illustration, but since these processes are frequently executed in the system 1, the order may be set arbitrarily.

After the process shown in step S115 is terminated, the procedure returns to step S103, and the process of step S103 and the subsequent processes are repeatedly executed based on the updated vacancy information and purchase history information. Although not shown in the flowchart shown in FIG. 6, in reality, for example, change in the sales strategy information in the host profile information according to a sales record, change in the member profile information due to registration of new members, withdrawal of existing members, or the like, change in the event meta-information according to change in event content, or the like, may be frequently performed. In the flowchart shown in FIG. 6, such change in the host profile information, the event meta-information and the member profile information may be appropriately executed. In such a case, the processes shown in the respective steps may be executed based on the changed information. Furthermore, the generation process of the prediction model shown in step S105 may not be performed whenever the series of processes shown in FIG. 6 are executed. For example, the process shown in step S105 may be performed once in a week or at a timing when a predetermined amount of purchase history information is updated, and thus, the prediction model may be updated.

Hereinbefore, the information processing method according to the first embodiment has been described with reference to FIG. 6.

2-4. Display Example

As described with reference to FIG. 3, in the system 1 according to the first embodiment, the host may input event meta-information, host profile information, or the like through the input/output unit 160. By providing such an input/output interface capable of collectively inputting information necessary for the system 1, it is possible to enhance convenience of a host.

A display example in the input/output unit 160 will be described with reference to FIG. 7. FIG. 7 is a diagram illustrating a display example of an information input screen on which a variety of information is input by a host.

A display screen 310 shown in FIG. 7 corresponds to a display screen of the input/output unit 160 shown in FIG. 3, for example. A host may input a variety of information to the system 1 through the display screen 310. Further, the display screen 310 shown in FIG. 7 is merely an example of an information input screen provided to the host, and the information input screen may have a different configuration.

Referring to FIG. 7, the display screen 310 is divided into an area 311 in which event information is mainly registered, an area 312 in which information about a ticket sales site is mainly registered, and an area 313 in which information about an advertisement of an event to be presented to users is registered.

In the area 311, for example, information about a title of an event, a cast member (artist) in the event, a venue of the event, an opening date and time of the event, or the like may be input in a drop-down list form. The information is registered in the event meta-information DB 212 of the event management system X210 shown in FIG. 3, as event meta-information, for example. In the area 311, and the other areas 312 and 313 (which will be described later), the input form of the information is not limited to the drop-down list form, and a variety of information may be directly input as a text. Furthermore, in the area 311, a variety of information relevant to the event other than the exemplified items may be input.

In the area 312, for example, information about a ticket sales site title, a ticket sales start date and time in each sales site, a ticket sales end date and time in each sales site, a ticket sales area in each sales site, the number of tickets for sale in each sales site, a ticket sales strategy in each sales site, or the like may be input in a pull-down form. The information about the ticket sales start date and time, the sales end date and time, the sales area, and the number of tickets for sale is registered in the event meta-information DB 212 of the event management system X210 shown in FIG. 3, as event meta-information, for example. Furthermore, the information about the ticket sales strategy is registered in the host profile information DB 140 shown in FIG. 3, as host profile information, for example. In the area 312, a variety of information capable of being set for each sales site, in addition to the exemplified items, may be input.

In the area 312, information about a sales strategy determined by the sales strategy determination unit 136 shown in FIG. 4 may be displayed. A host may input sales strategy information with reference to the displayed information. Furthermore, in the area 312, a graphical user interface (GUI) capable of correcting the sales strategy determined by the displayed sales strategy determination unit 136 may be provided.

In the area 313, for example, a layout of advertisements and a right for changing the layout when an event is presented to a user may be input. In the area 313, a variety of information relevant to advertisements of an event, in addition to the exemplified items, may be input.

Hereinbefore, one display example of an information input screen on which a variety of information is input by a host has been described with reference to FIG. 7.

2-5. Modification Example

Next, a modification example of the first embodiment will be described. As described in the above description (2-1. Overview of system), the system 1 according to the first embodiment is provided with the common prediction engine 150, and an event to be recommended to a user in each management system is determined by the common prediction engine 150. Here, the system 1 according to the first embodiment is not limited to such an example, and may have a different configuration. For example, a prediction engine of each management system may function as the common prediction engine 150.

Figure 8:
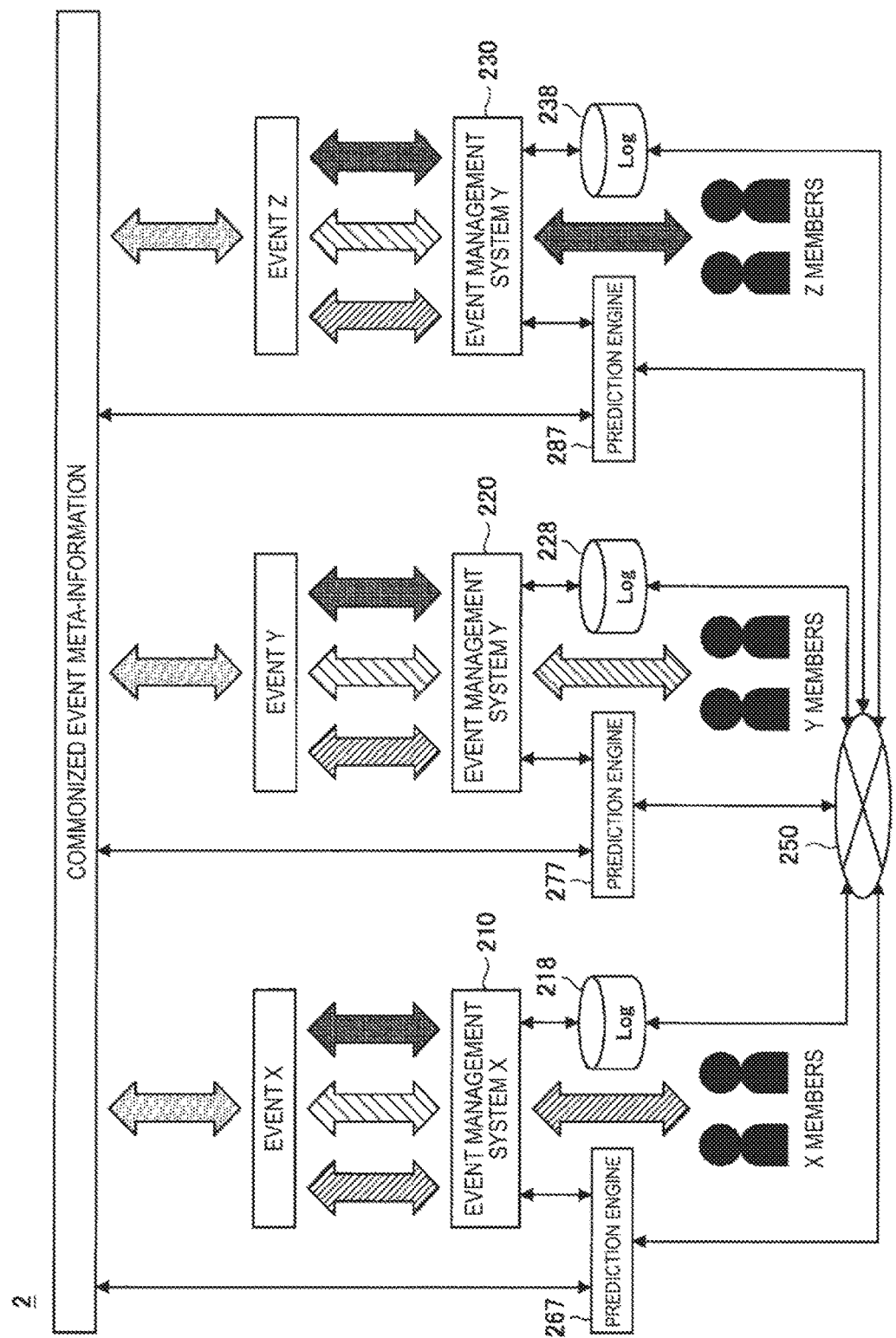
FIG. 8 is a diagram illustrating an overview of a system according to a modification example in which a prediction engine is provided in each management system.

As a modification example of the first embodiment, a modification example in which a prediction engine is provided in each management system will be described with reference to FIG. 8. FIG. 8 is a diagram illustrating an overview of a system according to a modification example in which a prediction engine is provided in each management system. The system according to this modification example corresponds to an example in which a configuration of a prediction engine is modified in the system 1 according to the first embodiment, and configurations and functions of other members are similar to those of the system 1. Accordingly, in the following description about this modification example, detailed description about points that are the same as in the system 1 according to the first embodiment will not be repeated, and different points from the system 1 will be mainly described.

Referring to FIG. 8, in a system 2 according to this modification example, an event X is managed by an event management system X210, an event Y is managed by an event management system X220, and an event Z is managed by an event management system Z230. The event management system X210 includes a prediction engine 267 that predicts a recommendation event for X members who are members of the event management system X210, and a log 218 in which purchase history information about the X members is accumulated. In addition, the event management system Y220 includes a prediction engine 277 that predicts a recommendation event for Y members who are members of the event management system Y220, and a log 228 in which purchase history information about the Y members is accumulated. Furthermore, the event management system Z230 includes a prediction engine 287 that predicts a recommendation event for Z members who are members of the event management system Z230, and a log 238 in which purchase history information about the Z members is accumulated. Here, since the event management system X210, the event management system Y220, the event management system Z230, and the logs 218, 228, and 238 have similar functions as those of the configurations shown in FIG. 1, detailed description thereof will not be repeated.

The system 1 retains commonized event meta-information obtained by converting event meta-information on the event X, event meta-information on the event Y, and event meta-information on the event Z into a common schema, similar to the system 1 according to the first embodiment. Thus, the events managed by the respective management systems are managed by the same schema as the commonized event meta-information. Although not shown in FIG. 8, in the system 2, member profile information and vacancy information, in addition to the event meta-information are converted into the common schemas, similar to the system 1.

Here, in the system 1, the common prediction engine 150 capable of accessing the respective management systems in a crossing manner is provided. On the other hand, in this modification example, the common prediction engine 150 is not provided, and each of the prediction engines 267, 277, and 287 in the respective management systems has similar function as in the common prediction engine 150.

Specifically, the prediction engine 267 in the event management system X210 is configured to be able to access the logs 228 and 238 in the other management systems through a network 250. The prediction engine 267 is configured to be able to access the commonized event meta-information (and the other commonized information). The prediction engine 267 has similar function as that of the common prediction engine 150 shown in FIG. 2, and may determine combinations of an event to be recommended and users, based on the commonized event meta-information and the logs 218, 228, and 238 (that is, purchase history information) in the respective management systems. Although detailed description is not shown, the other prediction engines 277 and 287 also have similar function as that of the prediction engine 267.

In the system 2, similarly, it is possible to obtain similar effects as in the system 1. In other words, in the general system shown in FIG. 4, the prediction engines 217, 227, and 237 can recommend only an event managed by the event management system X210 to a user. However, in this modification example, since event meta-information is collectively managed by the same schema, the prediction engine 267 is also capable of selecting events managed by the event management system Y220 and the event management system Z230 which are other management systems as an event recommended to a user.

Further, in the general system 4, each of the prediction engines 217, 227, and 237 can access only each of the logs 218, 228, and 238 which are managed by the management systems in which the prediction engines 217, 227, and 237 are provided, and determines combination of an event to be recommended and users based on information stored in the log 218, 228, or 238 in any of the management systems. However, in this modification example, the prediction engines 267, 277, and 287 are configured to be able to access the logs 218, 228, and 238 in the other management systems in a crossing manner. Furthermore, the prediction engines 267, 277, and 287 may recognize events managed by the other management systems using the commonized event meta-information. Accordingly, the prediction engines 267, 277, and 287 can determine combinations of an event to be recommended and users comprehensively using the logs 218, 228, and 238 in the other management systems. Accordingly, it is possible to enhance the accuracy of prediction, and to achieve accurate event recommendation.

Hereinbefore, the modification example in which the prediction engine is provided in each management system has been described as a modification example of the first embodiment, with reference to FIG. 8. As described above, according to this modification example, the prediction engine provided in each management system performs similar role as in the common prediction engine, and thus, it is possible to realize similar function as in the system 1 using a configuration different from that of the above-described system 1. A designer of a system can appropriately select any one of the configurations of the system 1 and the system 2 so as to easily configure the system according to a configuration or the like of each management system, for example.

3. Second Embodiment

Next, a second embodiment will be described. In the above-described first embodiment, an event is recommended to members of each management system according to a processing result in the common prediction engine 150. In this way, in the first embodiment, users to whom an event is to be recommended are limited to members of a specific management system. Further, information for generating a prediction model by the common prediction engine 150 is also limited to logs (purchase history information) in respective management systems.

Accordingly, in the second embodiment, a system that presents an event to more users, without being limited to members of each management system, is proposed. Furthermore, a system capable of generating a prediction model based on behavior histories of more users, without being limited to the members of each management system, is proposed.

Here, generally, a method for presuming each user's preference or interest based on a user's behavior history and delivering a digital advertisement through the Internet or the like by narrowing down targets (so-called targeting advertisement) is known. The second embodiment schematically corresponds to a technique in which the technique described in the first embodiment is applied to such a targeting advertisement. In the following description of the second embodiment, first, a system according to a general targeting advertisement will be described, and how to apply the system 1 according to the first embodiment to this system will be described. Then, details about the system according to the second embodiment configured by a combination of the system according to the targeting advertisements and the system 1 according to the first embodiment will be described.

3-1. Targeting Advertisement

Figure 9:
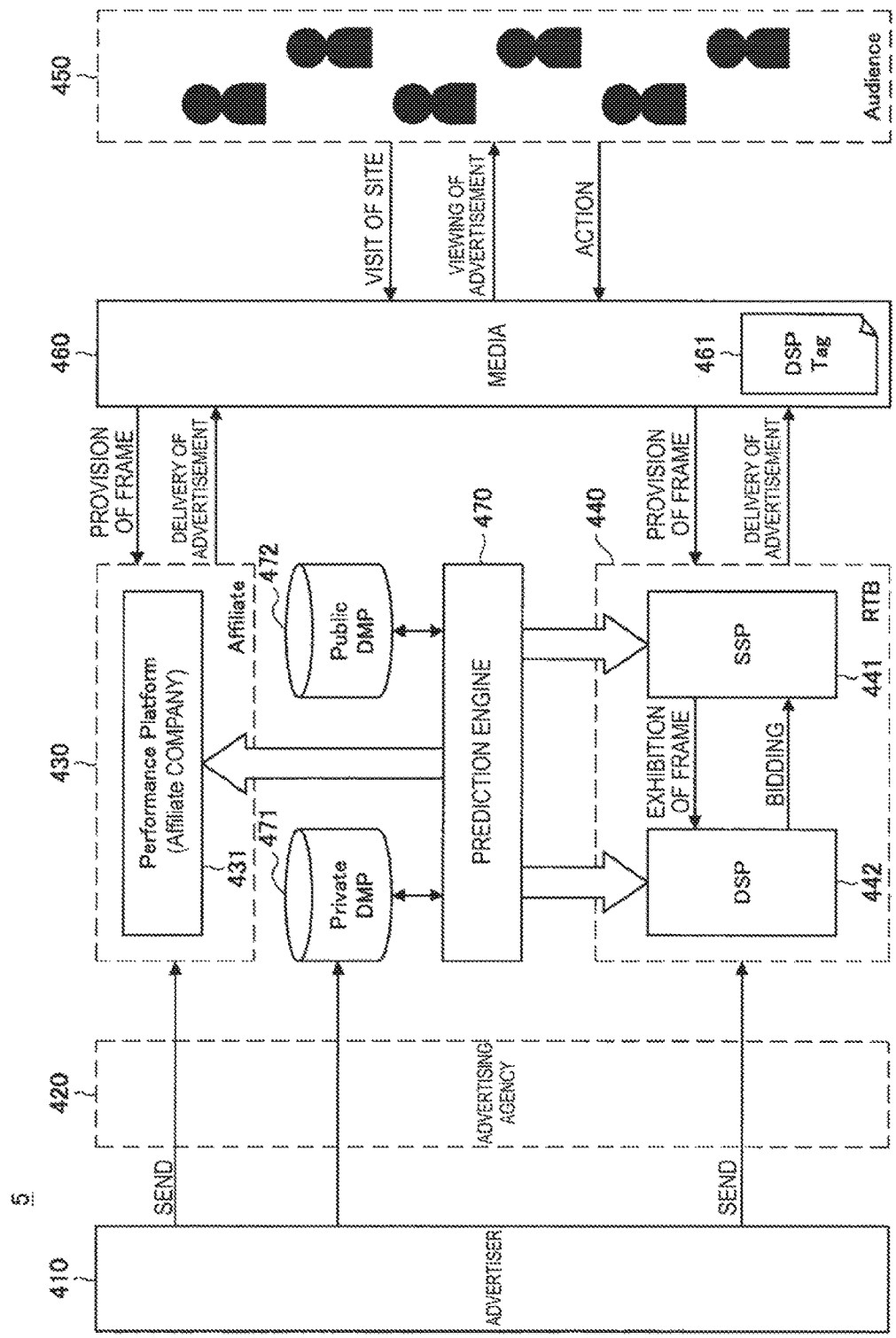
FIG. 9 is an illustrative diagram for describing a system relating to a general targeting advertisement.

A system according to a general targeting advertisement will be described with reference to FIG. 9. FIG. 9 is an illustrative diagram for describing the system according to the general targeting advertisement.

In a system 5 shown in FIG. 9, audiences 450 (users 450) are general net users. In the targeting advertisement, for example, when users 450 visit a media 460 (for example, a web page or the like), advertisements based on users' preferences or interests are displayed in an advertisement display area (advertisement frame) in the media 460.

In the example shown in FIG. 9, as an example of companies which deliver advertisements to the advertisement frame of the media 460, an affiliate company 431 and a demand side platform (DSP) company 442 are shown. Advertisement data about content (for example, event) is provided (sent) from an advertiser 410 to the affiliate company 431 and the DSP company 442, and the affiliate company 431 and the DSP company 442 deliver the advertisement data to the advertisement frame of the media 460. Creation of the advertisement data or sending of the advertisement data may be performed through an advertising agency 420, or the like. For example, in a case in which the content is an event, the advertiser 410 may be a host of the event.

The affiliate system 430 is a system in which the user 450 performs member registration in a system managed by the advertiser 410 or purchases goods of the advertiser 410 through an advertisement delivered to the advertisement frame, so that rewards are paid to a manager of the media 460. Furthermore, a real time bidding (RTB) system 440 to which the DSP company 442 belongs is a system that supports trading of an advertisement frame between an advertiser and a manager of the media 460. Specifically, in the RTB system 440, trading of an advertisement frame is performed in a real-time auction form between a supply side platform (SSP) company 441 which deposit-offers the advertisement frame from the manager of the media 460 and the DSP company 442 which deposit-manages the advertisement data from the advertiser 410, and advertisement data of the DSP company 442 which obtains the advertisement frame as a successful bid is published in the advertisement frame. The affiliate company 431 appropriately performs a targeting advertisement in consideration of behavior tendencies or preferences of the users 450 so that more users 450 can access the advertiser 410 through delivered advertisements and the DSP company 442 can more effective promotion with respect to a bidding price.

Generally, a history of behaviors of the users 450 on the media 460 (for example, reading, selection (click), conversion (purchasing or member registration), or the like) may be recognized for each Cookie ID through Cookie. This may be realized as the DSP company 442 installs a tag (DSP tag 461) in the media 460 (web page) and identifies the users 450 through the Cookie IDs using the tag. This method is referred to as Cookie-Sync. Furthermore, purchase histories of members in a system (for example, the event management system X210 shown in FIG. 2) managed by the advertiser 410 is managed as a Private data management platform (DMP) 471 or a Public DMP 472. The prediction engine 470 may determine combinations of an event to be recommended and users using the behavior histories of the users 450 on the media 460, and information in the Private DMP 471 and/or information in the Public DMP 472 of the user 450.

The prediction engine 470 provides information about the determined combinations of the event and the users to the DSP company 442 and/or the affiliate company 431. Thus, appropriate event advertisements suitable for preferences of the users 450 are delivered by the DSP company 442 and/or the affiliate company 431. Furthermore, the prediction engine 470 may provide the information about the determined combinations of the event and the users to the SSP company 441. Thus, the SSP 441 can work out a strategy for selling the advertisement frame, for example, to select a web site for installation of the advertisement frame so that the advertisement frame is purchased at a high bidding price.

Hereinbefore, a system 5 according to a general targeting advertisement will be described.

Here, as described above, in the second embodiment of the present disclosure, the system 1 according to the first embodiment is applied to the system 5 shown in FIG. 9. The logs 218, 228, and 238, and the purchase history information DB 215 described in the first embodiment may correspond to the Private DMP 471 shown in FIG. 9. Furthermore, the advertiser 410 may correspond to a host of an event. On the other hand, in the first embodiment, by commonizing event meta-information and comprehensively using the logs 218, 228, and 238 managed by different management systems, it is possible to enhance the accuracy of prediction in a prediction engine. Accordingly, in the second embodiment of the present disclosure, by applying the system 1 according to the first embodiment to the system 5 shown in FIG. 9, it is possible to provide a prediction engine with higher accuracy, comprehensively using the logs 218, 228, and 238 (in other words, the Private DMP 471) managed by different management systems and behavior histories of the users 450 on the media 460. Further, in the second embodiment, users to whom an advertisement of an event is delivered are not limited to members of management systems, and delivery targets of the advertisement can be expanded up to general net users.

Hereinafter, such a system according to the second embodiment will be described in detail. In the following description of the second embodiment, a case in which an advertisement is delivered by a DSP company based on a processing result of a prediction engine will be described. Here, the second embodiment is not limited to such an example, and a company which delivers an advertisement may be a different company such as the above-described affiliate company, for example.

3-2. Overview of System

Figure 10:
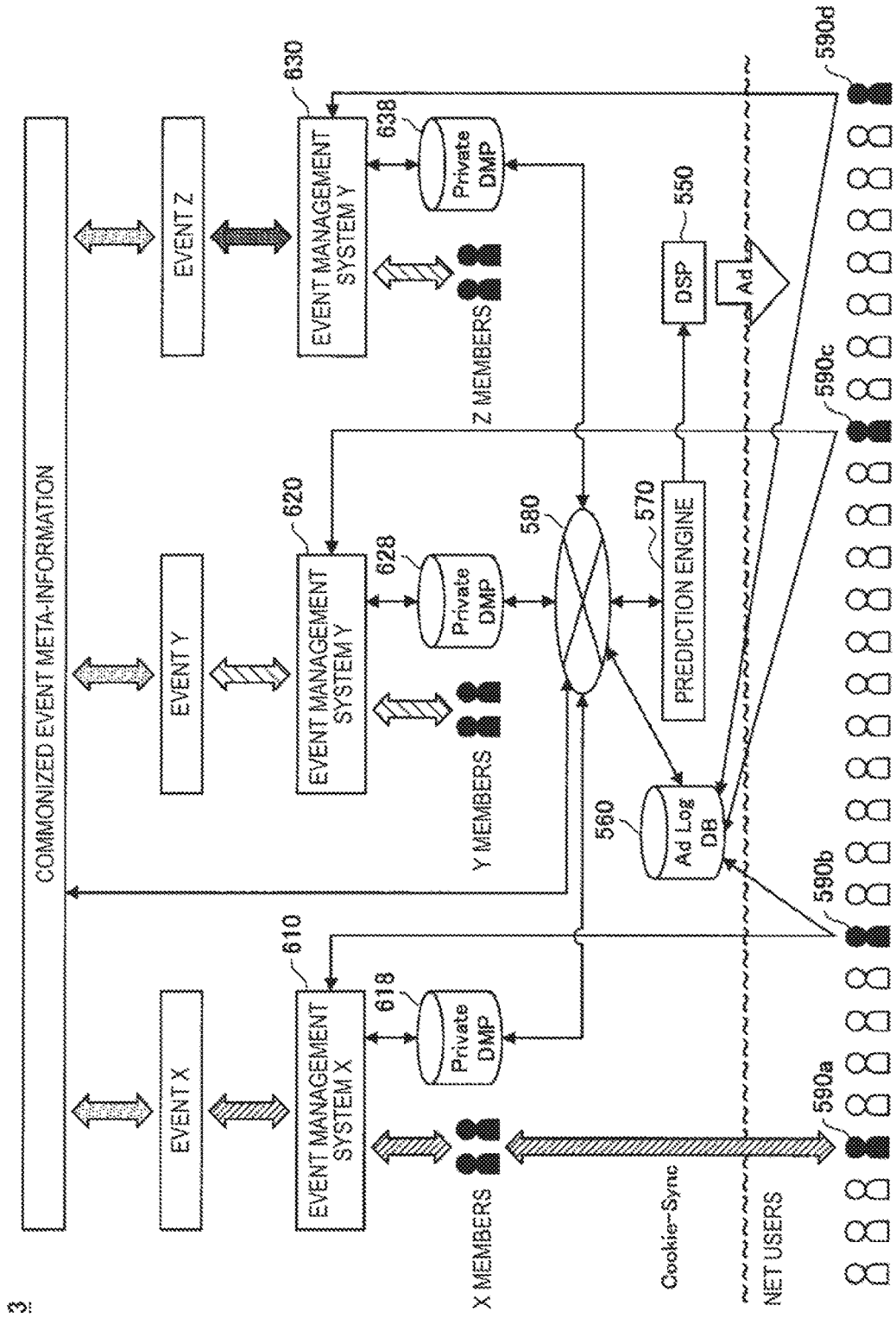
FIG. 10 is a diagram illustrating an overview of a system according to a second embodiment.

An overview of the system according to the second embodiment will be described with reference to FIG. 10. FIG. 10 is an illustrative diagram for describing the overview of the system according to the second embodiment. More detailed configuration of the system according to the second embodiment will be described in detail in the following description (3-3. Configuration of system). In the following description of the second embodiment, detailed description will not be repeated with respect to substantially similar configurations as those of the first embodiment, and different points from those of the first embodiment will be mainly described.

Referring to FIG. 10, in a system 3 according to the second embodiment, an event X is managed by an event management system X610, an event Y is managed by an event management system Y620, and an event Z is managed by an event management system Z630. The event management system X610 has a Private DMP 618 in which purchase history information about X members who are members of the event management system X610 is accumulated. In addition, the event management system Y620 has a private DMP 628 in which purchase history information about Y members who are members of the event management system Y620 is accumulated. Further, the event management system Z630 has a Private DMP 638 in which purchase history information about Z members who are members of the event management system Z630 is accumulated. Here, the Private DMPs 618, 628, and 638 have approximately similar functions as in the logs 218, 228, and 238 shown in FIG. 3.

The system 3 also retains commonized event meta-information obtained by converting event meta-information on the event X, event meta-information on the event Y, and event meta-information on the event Z into a common schema, similar to the system 1 according to the first embodiment. Thus, the events managed by the respective management systems are managed by the same schema as the commonized event meta-information. Although not shown in FIG. 10, in the system 3, member profile information and vacancy information, in addition to the event meta-information are converted into the common schemas, similar to the system 1.

Further, the system 3 includes an Ad Log DB 560. The Ad Log DB 560 represents a database in which behavior history information about users on a web site is accumulated. In the AD Log DB 560, the users are managed by Cookie IDs.

A common prediction engine 570 is configured to be able to access the Private DMPs 618, 628, and 638 which are managed by the respective management systems in a crossing manner, and to be able to access the above-described commonized event meta-information and the Ad Log DB 560. The common prediction engine 570 determines combinations of an event to be recommended and users based on purchase history information in the Private DMPs 618, 628, and 638, commonized event meta-information, and users behavior history information in the Ad Log DB 560.

Similar to the first embodiment, in the second embodiment, the common prediction engine 570 can determine combinations of an event to be recommended and users, by comprehensively using the Private DMPs 618, 628, and 638 in other management systems using commonized event meta-information. Accordingly, it is possible to further enhance the accuracy of the prediction process in the common prediction engine 570, and to perform more accurate matching of events and users. Here, in the second embodiment, users' behavior history information in the Ad Log DB 560 may also be used for the prediction process in the common prediction engine 570.

Here, in each management system, users are managed by user IDs as members registered in each management system. On the other hand, as described above, in the Ad Log DB 560, users are managed by Cookie IDs. Accordingly, in the second embodiment, Cookie IDs of respective members are identified, and users are collectively managed by the Cookie IDs. Thus, users' behaviors on the management system (ticket purchase, or the like) and users' behaviors on a web site (reading of the web site, link selection, or the like) are connected to each other. In this way, in the second embodiment, users may be appropriately managed by Cookie IDs. The user IDs in the first embodiment may be replaced with the Cookie IDs in the second embodiment.

The above-described identification of the Cookie IDs of the members may be realized using a method called Cookie-Sync, for example. In the Cookie-Sync, for example, as a subject that performs the identification embeds a tag in a web site, a predetermined Cookie is set with respect to a browser of a user who visits the web site. For example, even in a case in which the user visits another web site, through the set Cookie, the user is uniquely specified.

The Cookie-Sync is a method which is generally widely used. For example, as shown in the description (3-1. Targeting advertisement), in order to perform a targeting advertisement, a DSP company generally performs a process of embedding a tag in a web site, specifying a user using the Cookie-Sync, and estimating a user's preference or interest from a user's behavior history. For example, in the second embodiment, the DSP company may identify Cookie IDs of members by executing the Cookie-Sync using the installed tag. In this way, it is possible to build the system 3 at lower cost using the existing tag without necessity for installing a new tag. As described above, since the Cookie-Sync is a method which is generally widely used, detailed description about the Cookie-Sync will not be made.

For example, it is assumed that X members purchase tickets of a certain event using the event management system X610. Then, Cookie IDs of the X members are identified using the Cookie-Sync. Thus, a behavior history of an X member (a user 590*a* in the figure) on the web site may be specified.

Similarly, a behavior on the management system and a behavior on a web site of other users are recognized by Cookie IDs in connection. For example, it is assumed that a user 590*b* different from the user 590*a* purchases a ticket of a certain event using the event management system X610. Ticket purchase history information of the user 590*b* is stored in the Private DMP 618. In addition, behavior history information of the user 590*b* on a web site is stored in the Ad Log DB 560. Similarly, ticket purchase history information of a user 590*c* who purchases a ticket of a certain event using the event management system Y620 is stored in the Private DMP 628, and behavior history information of the user 590*c* on a web site is stored in the Ad Log DB 560. Furthermore, ticket purchase history information of a user 590*d* who purchases a ticket of a certain event using the event management system Z630 is stored in the Private DMP 638, and behavior history information of the user 590*d* on a web site is stored in the Ad Log DB 560.

Accordingly, the common prediction engine 570 may determine, comprehensively using purchase history information and behavior history information of a certain user, a combination of an event to be recommended and the user with reference to the purchase history information on the management systems stored in the Private DMPs 618, 628, and 638, and the behavior history information on the web site stored in the Ad Log DB 560. Accordingly, the accuracy of the prediction process in the common prediction engine 570 is further enhanced.

The event is presented to the user based on the combination of the event and the user determined by the common prediction engine 570. Here, in the second embodiment, since a user to whom an event is to be recommended is determined also using the behavior history information in the Ad Log DB 560, it is not necessary that the user is limited to a member of any management system. For example, if the common prediction engine 570 selects users to whom a certain event is to be recommended, as a result, a user who is presumed to be interested in the event may be selected from users who are not members based on behavior history information. In this way, in the second embodiment, it is possible to expand recommendation targets of an event up to users who are not members of a management system, and to further promote purchase of merchandise.

Here, in the first embodiment, since users are managed by user IDs in respective management systems, in a case in which the same user is registered as members of different management systems and is given a plurality of user IDs, the user is handled as an individual for each user ID. However, in the second embodiment, since a user is managed by a Cookie ID, even when the same user is registered as members of different management systems, the user can be uniquely identified as one user. Accordingly, in performing matching of an event to be recommended and users, it is possible to avoid a plurality of times of matching of the same user, to thereby realize delivery of an advertisement with higher efficiency.

Hereinbefore, the overview of the system 3 according to the second embodiment has been described with reference to FIG. 10. As described above, according to the second embodiment, combinations of an event to be recommended and users are determined with reference to behavior history information on a web site, in addition to Private DMPs (purchase history information) in respective management systems. Here, for example, since a user (member) in a management system and a user who uses a web site are connected to each other through a Cookie ID, for example, the common prediction engine 570 can analyze a preference of the user comprehensively using the purchase history information and the behavior history information, and can perform event matching. Accordingly, it is possible to perform the matching with higher accuracy.

Furthermore, in the second embodiment, a user who is not a member of a management system may be selected as a recommendation target of an event. Accordingly, it is possible to expand recommendation targets of the event, and to further promote purchase of tickets of the event.

3-3. Configuration of System

Figure 11:
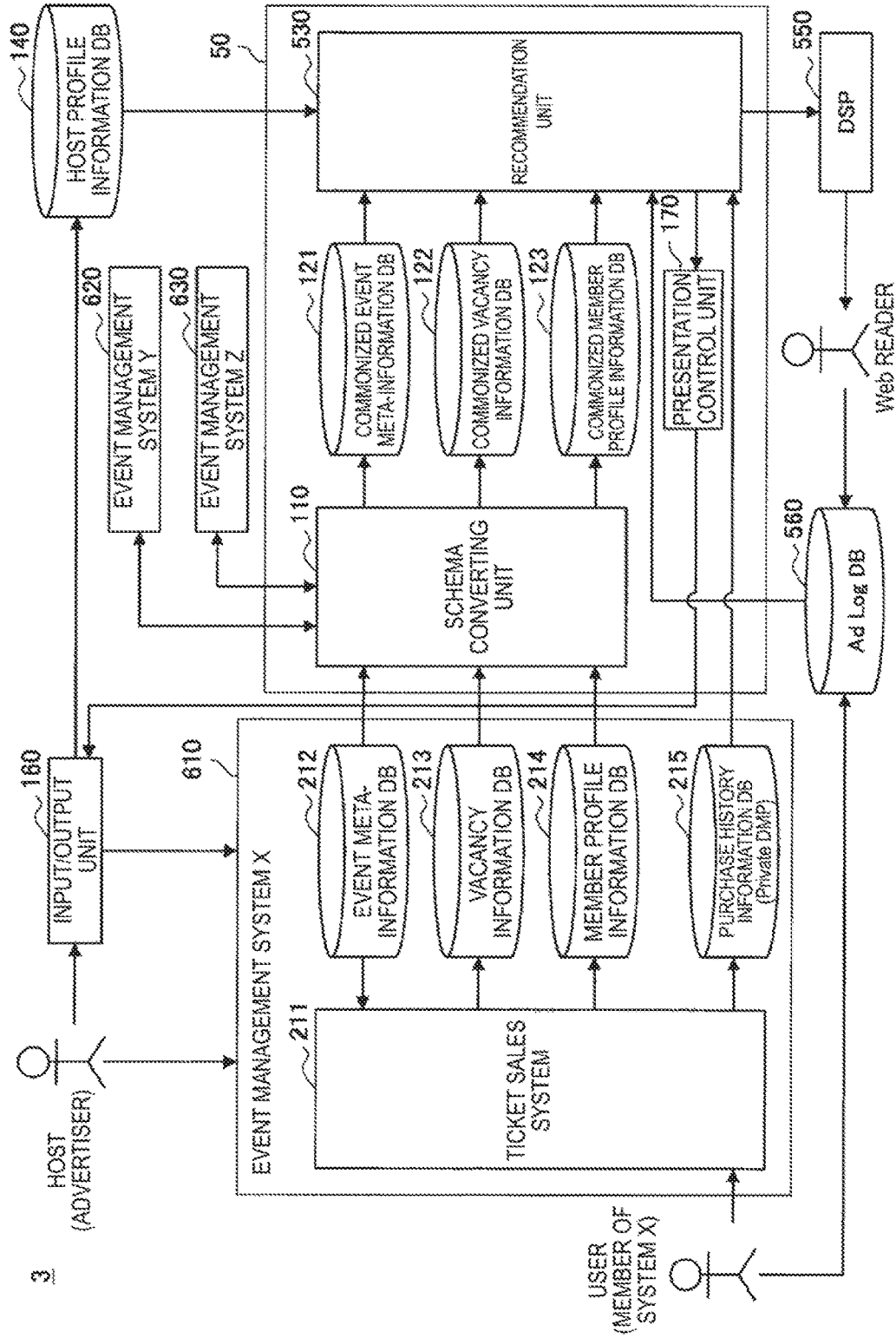
FIG. 11 is a block diagram illustrating an exemplary configuration of the system according to the second embodiment.

The configuration of the system 3 according to the second embodiment described above will be described in detail with reference to FIGS. 11 and 12. FIG. 11 is a block diagram illustrating a configuration example of the system 3 according to the second embodiment. FIG. 12 is a functional block diagram illustrating an exemplary functional configuration of a recommendation unit 530 shown in FIG. 11.

Referring to FIG. 11, the system 3 according to the second embodiment includes an information processing device 50, an event management system X610, an event management system Y620, an event management system Z630, a host profile information DB 140, an input/output unit 160, and an Ad Log 560. Here, the event management system X610, the event management system Y620, and the event management system Z630 correspond to the event management system X610, the event management system Y620, and the event management system Z630 shown in FIG. 10, respectively. Furthermore, the Ad Log DB 560 corresponds to the Ad Log DB 560 shown in FIG. 10. Since the host profile information DB 140 and the input/output unit 160 have similar functions as those of the configurations shown in FIG. 3, detailed description thereof will not be repeated.

In FIG. 11, as an example, a configuration of the event management system X610 is shown in detail, but the event management system Y620 and the event management system Z630 which are different management systems may have similar configuration. Furthermore, hereinafter, in order to describe a process in the event management system X610, a process executed between a user who is a member of the event management system X610 and the event management system X610 is described, but similar process may be executed even between the event management system Y620 and members of the event management system Y620, and similar process may be executed between the event management system Z630 and members of the event management system Z630.

(Ad Log DB 560)

The Ad Log DB 560 stores user's behavior history information on a web site. The behavior history information includes information about all behaviors performed by a user on media (for example, web sites). For example, the behavior history information includes information about web sites that a user reads, information about links that the user selects on the web sites, information about conversion of the user on the web sites (for example, purchase of merchandise, member registration, or the like), or the like. In the Ad Log DB 560, the behavior history information is managed by Cookie IDs. A specific method for acquiring behavior history information is will be described in the following description (3-4. Specific example of behavior history information acquisition method).

(Event Management System X610)

The event management system X610 includes a ticket sales system 211, an event meta-information DB 212, a vacancy information DB 213, a member profile information DB 214, and a purchase history information DB 215, as its functions. The purchase history information DB 215 corresponds to the Private DMP 618 shown in FIG. 10. Since the ticket sales system 211, the event meta-information DB 212, the vacancy information DB 213, the member profile information DB 214, and the purchase history information DB 215 have similar functions as those of the configurations shown in FIG. 3, detailed description thereof will not be repeated.

(Information Processing Device 50)

The information processing device 50 includes a schema converting unit 110, a commonized event meta-information DB 121, a commonized vacancy information DB 122, a commonized member profile information DB 123, a recommendation unit 530, and a presentation control unit 170, as its functions. The schema converting unit 110, the recommendation unit 530, and the presentation control unit 170 are configured by various processors such as a CPU or a DSP, for example, and functions of the schema converting unit 110, the recommendation unit 130, and the presentation control unit 170 may be realized as the processor is operated according to a predetermined program. Furthermore, since the schema converting unit 110, the presentation control unit 170, the commonized event meta-information DB 121, the commonized vacancy information DB 122, and the commonized member profile information DB 123 have similar functions as those of the configurations shown in FIG. 3, detailed description thereof will not be repeated.

The recommendation unit 530 determines combinations of an event to be recommended and users based on commonized event meta-information, purchase history information, and behavior history information. The recommendation unit 530 has a function corresponding to the common prediction engine 570 shown in FIG. 10.

A method for using the commonized information and the purchase history information in the recommendation unit 530 is similar as in the recommendation unit 130 in the first embodiment. That is, the recommendation unit 530 associates the purchase history information in the purchase history information DB 251 with the commonized event meta-information, to thereby generate a prediction model for selecting combinations of an event to be recommended and users comprehensively using the purchase history information in the respective management systems. Further, in the second embodiment, the recommendation unit 530 connects user IDs included in the purchase history information to Cookie IDs included in the behavior history information in the Ad Log DB 560 using a method such as a Cookie-Sync, for example, to thereby make it possible to connect purchase history information to behavior history information of the same users. Accordingly, the recommendation unit 530 can recognize which behaviors a user who purchases a ticket of a certain event, for example, performs on a web site. The recommendation unit 530 determines combinations of an event to be recommended and users using both of the purchase history information and the behavior history information identified by the user in this way. Thus, the recommendation process is realized with higher accuracy.

Furthermore, the recommendation unit 530 has a function for determining a sales strategy, similar to the recommendation unit 130 in the first embodiment. Here, the recommendation unit 530 may determine the sales strategy further using the behavior history information, in addition to the common event meta-information and the purchase history information. Accordingly, the sales strategy can be determined with higher accuracy.

Information about events and users selected by the recommendation unit 530 is provided to the DSP company 550. The DSP company 550 corresponds to the DSP company 442 shown in FIG. 9. Since a browser of each selected user can be specified by a Cookie ID, the DSP company 442 obtains an advertisement frame provided on a web browser used by the selected user as a successful bid by RTB, and displays an advertisement of the selected event in the successfully bid advertisement frame. In this way, in the second embodiment, it is possible to present to an event to a large number of unspecified net users. Accordingly, an event recommendation target range is further enlarged, and ticket purchase is promoted.

Here, a functional configuration of the recommendation unit 530 will be described in detail with reference to FIG. 12. Referring to FIG. 12, the recommendation unit 530 includes a host profile information acquisition unit 131, a commonized information acquisition unit 132, a purchase history information acquisition unit 133, a behavior history information acquisition unit 536, a prediction model generation unit 534, an event-user determination unit 535, and a sales strategy determination unit 537, as its functions. Here, for ease of description, in FIG. 12, as a configuration that performs transmission and reception of information with the recommendation unit 530, the host profile information DB 140, the common information DB 120, the purchase history information DB 215, the Ad Log DB 560, and the presentation control unit 170 are shown in addition. Similar to FIG. 4, the commonized information DB 120 is shown as a single block that generally represents the commonized event meta-information DB 121, the commonized vacancy information DB 122, and the commonized member profile information DB 123 shown in FIG. 11. Further, since the functions of the host profile information acquisition unit 131, the commonized information acquisition unit 132, and the purchase history information acquisition unit 133, among functions of the recommendation unit 530, are similar to the functions of the configurations shown in FIG. 4, detailed description thereof will not be repeated.

The behavior history information acquisition unit 536 acquires behavior history information from the Ad Log DB 560. The behavior history information acquisition unit 536 provides the acquired behavior history information to the prediction model generation unit 534, the event-user determination unit 535, and the sales strategy determination unit 537.

The sales strategy determination unit 537 determines a sales strategy of an event based on commonized event meta-information and purchase history information in the respective management systems. In the second embodiment, the purchase history information in the purchase history information DBs 215 in the respective management systems is associated with event meta-information, and user IDs included in the purchase history information and Cookie IDs included in the behavior history information in the Ad Log DB 560 are associated with each other by a method such as Cookie-Sync, for example. Accordingly, the sales strategy determination unit 537 can determine a sales strategy comprehensively using the purchase history information and the behavior history information in the respective management systems. Since the function of the sales strategy determination unit 537 is similar to the function of the sales strategy determination unit 136 in the first embodiment, except that the behavior history information is further used, and detailed description thereof will not be repeated.

Similar to the first embodiment, the sales strategy determination unit 537 provides information about the determined sales strategy to the presentation control unit 170. The information about the sales strategy is presented to a host through the input/output unit 160 by the presentation control unit 170. The host can determines a final sales strategy with reference to the presented information, and can input the result to the host profile information DB 140 as host profile information.

The prediction model generation unit 534 generates a prediction model for selecting combinations of an event to be recommended and users based on commonized event meta-information, purchase history information, and behavior history information. As described above, since the purchase history information and the behavior history information in the respective management systems are associated with each other, the prediction model generation unit 534 can generate a prediction model comprehensively using the information.

Since the function of the prediction model generation unit 534 is similar to the function of the prediction model generation unit 134 in the first embodiment, except that behavior history information is further used, detailed description thereof will not be repeated. The type of the prediction model generated by the prediction model generation unit 534 may be similar to the prediction model generated by the prediction model generation unit 134 shown in FIG. 4. Furthermore, the prediction model generation unit 534 can generate the prediction model further based on sale history information, user's behavior tendency information, or the like, similar to the prediction model generation unit 134 shown in FIG. 4. The prediction model generation unit 534 provides the generated prediction model to the event-user determination unit 535.

The event-user determination unit 535 determines combinations of an event to be recommended and users based on the generated prediction model. Since the process performed by the event-user determination unit 535 is approximately similar to the prediction model generation unit 134 shown in FIG. 4, and detailed description thereof will not be repeated. Here, in the second embodiment, the event-user determination unit 535 may select users to whom an event is to be recommended from candidates including a large number of unspecified users of which behavior history information is acquired in addition to members of a management system.

The event-user determination unit 535 provides information about the selected combinations of the event and the users to the DSP company 550. An advertisement of each selected event is displayed in an advertisement frame on a web browser of each selected user, by the DSP company 550, for example.

Hereinbefore, the configuration of the system 3 according to the second embodiment has been described with reference to FIGS. 11 and 12. As described above, according to the second embodiment, in addition to the configuration of the first embodiment, behavior history information indicating a user's behavior on media is further acquired. Since user IDs included in purchase history information and Cookie IDs included in behavior history information can be associated with each other by a method such as Cookie-Sync, for example, it is possible to achieve association of purchase history information and behavior history information of the same user. Accordingly, in the second embodiment, it is possible to comprehensively handle purchase history information and behavior history information in respective management systems, to thereby further enhance the accuracy of a prediction engine. Furthermore, event recommendation targets are enlarged up to a large number of unspecified users of which behavior history information is acquired, it is possible to deliver an advertisement to a large number of users. Accordingly, it is possible to promote sales of event tickets, and to realize a system which is highly convenient for a host. Further, from the viewpoint of users, events suitable for users' preferences are recommended, to thereby enhance convenience of the users.

The configuration of the information processing device 50 is not limited to the examples shown in FIGS. 11 and 12. For example, the respective functions of the information processing device 50 shown in FIGS. 11 and 12 may not be necessarily provided integrally in one device. The information processing device 50 may be configured so that the respective functions mounted in the information processing device 50 shown in FIGS. 11 and 12 are separately mounted in a plurality of devices and the plurality of devices are connected to communicate with each other. For example, each DB may be provided as an external device other than the information processing device 50, and the information processing device 50 may execute the above-described various processes while performing communication with the DBs which are external devices.

In addition, a computer program for realizing the functions of the information processing device 50 according to the above-described second embodiment may be created, and may be mounted in a personal computer or the like. Furthermore, a computer-readable recording medium on which such a computer program is stored may be provided. The recording medium is a magnetic disc, an optical disc, a magneto-optical disc, a flash memory, or the like, for example. The computer program may be delivered through a network, for example, without using the recording medium.

3-4. Specific Example of Method for Acquiring Behavior History Information

As described above, in the second embodiment, user's behaviors on a web site are acquired as behavior history information. An example of such a behavior history information acquisition method on the web site will be described with reference to FIGS. 13 and 14. FIGS. 13 and 14 are illustrative diagrams for describing the behavior history information acquisition method.

FIG. 13 shows an example of a web site 320 read by a user. For example, the web site 320 is a main page for ticket sales of a certain live event. For example, information indicating that the main page for ticket sales of the live event is read may be acquired as behavior history information.

Further, an image of cast members of the event, information about the event, and links to ticket sales sites (in the figure, "sales site X", "sales site Y", and "sales site Z") are displayed in the web site 320. In actually purchasing a ticket, a user selects a link of any sales site, and moves to the corresponding sales site to purchase the ticket. For example, information about which link is selected by the user may also be acquired as behavior history information.

FIG. 14 is a diagram more schematically illustrating a relationship between a main page for ticket sales and a sales site of a link destination. Referring to FIG. 14, a web site 330 is a main page for ticket sales of an event, similar to the web site 320 shown in FIG. 13.

In the web site 330, for example, as a link to a ticket sales site, a link 331 to a host company site, and a link 332 to another sales site X, and a link 333 to still another sales site Y are displayed. Further, on the web site 330, a tag 334 (for example, DSP tag) is set. Information indicating that a user reads the web site 330 and information indicating that the user selects any one of the links 331, 332, and 333 on the web site 330 are accumulated in the Ad Log DB 560 by the tag 334.

When a user selects the link 332, the web site 340 of the sales site X is displayed. Similarly, a tag 344 is set on the web site 340, and a user's behavior on the web site 340 is accumulated in the Ad Log DB 560 by the tag 344.

Furthermore, when a user selects the link 333, a web site 350 of the sales site Y is displayed. Similarly, a tag 354 is set on the web site 350, and a user's behavior on the web site 350 is accumulated in the Ad Log DB 560 by the tag 354.

In this way, by setting tags in respective ticket sales sites, in addition to a main page for ticket sales, it is possible to trace information indicating that a user has purchased a ticket, and also, a site on which the user has purchased the ticket, and to acquire the result as behavior history information. In this way, by setting tags even web sites of link destinations, it is possible to acquire more detailed behavior history information.

Hereinbefore, an example of the behavior history information acquisition method on the web site has been described with reference to FIGS. 13 and 14. In the above-described example, a case in which a tag is embedded to a main page for ticket sales or each sales site, and user's behavior information in the main page for ticket sales or each sales site is acquired based on the tag is shown, but the second embodiment is not limited to such an example. For example, by installation of a tag with respect to a certain web page, it is possible to acquire web page information (so-called referrer URL) before moving to the web page. In the second embodiment, in addition to a web page in which a tag is installed, information about a web page before moving to the web page with the tag installed may also be acquired as a piece of user's reading history information. Further, the web page in which the tag is installed may be a web page with no advertisement frame. By installing a tag in a web page with no advertisement frame, it is possible to more generally and widely acquire user's reading history information with respect to the web page. In the second embodiment, as described above, reading history information about a web page in which a tag is not directly installed and reading history information about a web page with no advertisement frame may be acquired as user's behavior history information, and may be reflected in a prediction model. Thus, it is possible to generate a prediction model that satisfies user's preferences with higher accuracy.

3-5. Information Processing Method

An information processing method according to the second embodiment, executed in the system 3 shown in FIG. 11, will be described with reference to FIG. 15. FIG. 15 is a flowchart illustrating an exemplary processing procedure of the information processing method according to the second embodiment. Hereinafter, the information processing method will be described with reference to an example in which an event S managed by the event management system X610 is recommended to a user in the system 3 shown in FIG. 11.

Referring to FIG. 15, in the information processing method according to the second embodiment, first, event meta-information and host profile information of an event S are registered by a host (step S201). Then, the event meta-information and vacancy information of the event S, and member profile information of management systems are converted into a common schema (step S203). Since the process shown in step S201 and the process shown in step S203 are respectively similar processes as the process shown in step S101 and the process shown in step S103 of the information processing method according to the first embodiment shown in FIG. 6, detailed description thereof will not be repeated.

Then, a sales strategy is determined based on commonized event meta-information, purchase history information, and behavior history information (step S204). For example, the sales strategy may be determined based on the type of an event, previous sales records of the same types of events, users' behaviors with respect to web pages relating to the event S, and the like. The process shown in step S204 corresponds to the process performed by the sales strategy determination unit 537 shown in FIG. 11, for example.

Then, a prediction model is generated based on the commonized event meta-information, the purchase history information, and the behavior history information (step S205). The prediction model refers to a model for predicting a user to whom the event S is to be recommended in consideration of the type of the event, a purchase history of the user, or the like. The process shown in step S205 corresponds to the process performed by the prediction model generation unit 534 shown in FIG. 11, for example.

Then, a user who matches the event S is selected based on the generated prediction model (step S207). The process shown in step S207 corresponds to the process performed by the event-user determination unit 535 shown in FIG. 11, for example. The users selected in the process shown in step S207 may be a large number of unspecified users acquired by behavior history information, without being limited to members of any management system.

Next, information about the event S and the selected users are provided to the DSP company 550 (step S209). Further, when the selected users visit the web site in which an advertisement frame is present, RTB is executed by the DSP company 550 (step S211).

In a case where the advertisement frame can be successfully bid, the DSP company 550 displays an advertisement of the event S on the advertisement frame (step S213). Thus, the event S to be recommended is presented to the selected users.

Then, users' behaviors on the web site is transmitted to the Ad Log DB 560 according to the tag set in the web site (step S215). Thus, behavior history information is accumulated in the Ad Log DB 560, and behavior history information in the Ad Log DB 560 is updated. For example, the behaviors on the web site represent behaviors with respect to the displayed advertisement of the event S. Here, in the process shown in step S215, all behaviors of all users on the web site, instead of the behaviors with respect to the advertisement of the event of the selected users, may be acquired as behavior history information.

Then, the vacancy information about the event S in the vacancy information DB 213 and the purchase history information of the user in the purchase history information DB 215 are updated according to a user's purchase behavior (step S217). In the process shown in step S217, in addition to a case in which a user views an advertisement of the event S and purchases a ticket of the event S, other purchase behaviors of the users may be reflected in the vacancy information in the vacancy information DB 213 and the purchase history information in the purchase history information DB 215.

Then, the vacancy information about the event S in the vacancy information DB 213 and the user's purchase history information in the purchase history information DB 215 are updated according to purchase records on off-line (step S219). Since the process shown in step S219 is similar to the process shown in step S115 in the information processing method according to the first embodiment shown in FIG. 6, detailed description thereof will not be repeated.

In FIG. 15, the process shown in step S215, the process shown in step S217, and the process shown in step S219 are shown in this order for convenience of illustration, but since these processes are frequently executed in the system 3, the order may be set arbitrarily.

After the process shown in step S219 is terminated, the procedure returns to step S103, and the process of step S203 and the subsequent processes are repeatedly executed based on the updated vacancy information, purchase history information, and behavior history information. Although not shown in the flowchart shown in FIG. 15, in reality, for example, change in the sales strategy information in the host profile information according to a sales record, change in the member profile information due to registration of new members, withdrawal of existing members, or the like, change in the event meta-information according to change in event content, or the like, may be frequently performed. In the flowchart shown in FIG. 15, such change in the host profile information, the event meta-information and the member profile information may be appropriately executed. In such a case, the processes shown in the respective steps may be executed based on the changed information. Furthermore, similarly to the first embodiment, the generation process of the prediction model shown in step S205 may not be performed whenever the series of processes shown in FIG. 15 are executed. For example, the process shown in step S205 may be performed once in a week or at a timing when a predetermined amount of purchase history information is updated, and thus, the prediction model may be updated.

Hereinbefore, the information processing method according to the second embodiment has been described with reference to FIG. 15.

4. Hardware Configuration

Figure 16:
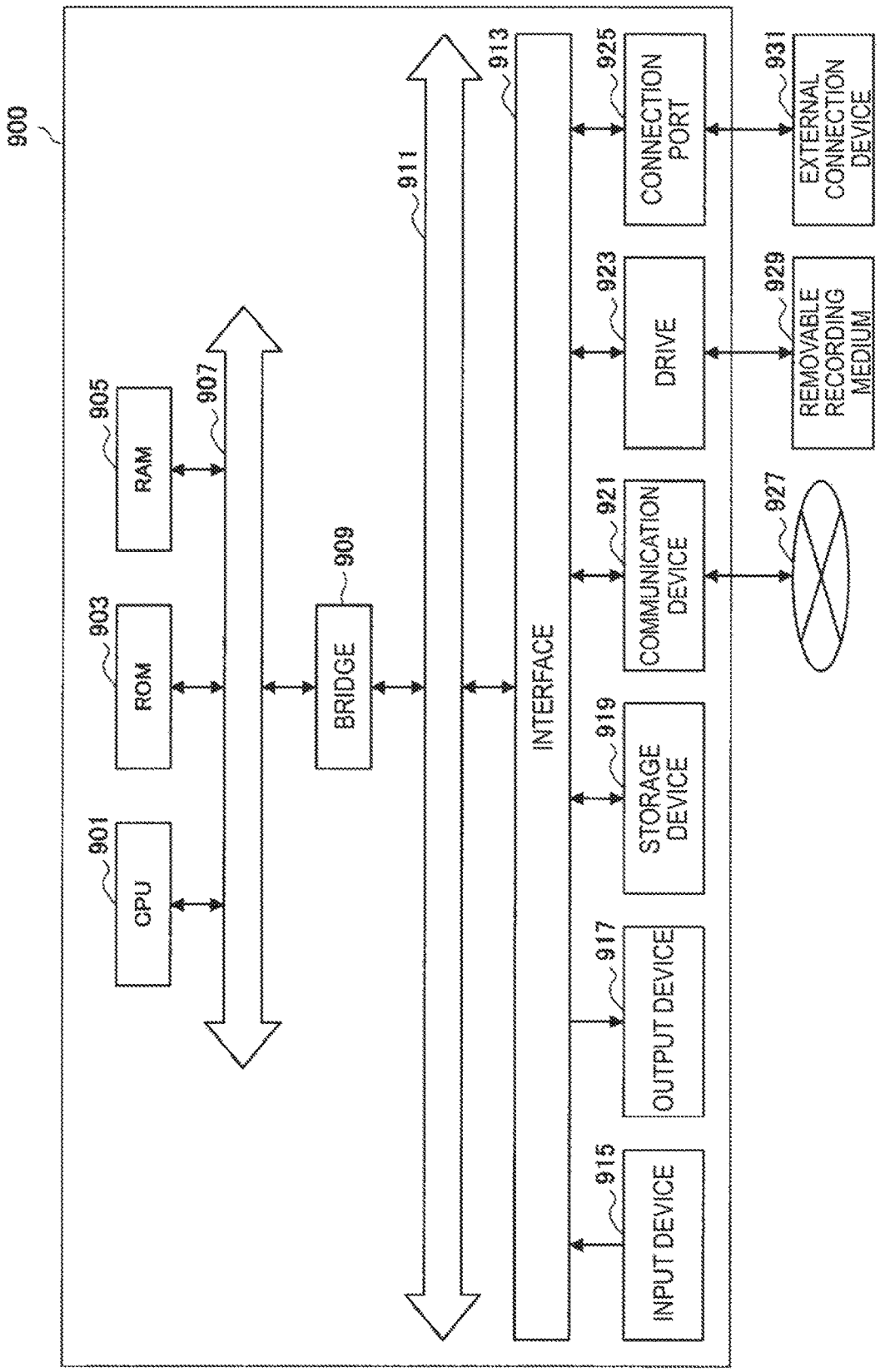
FIG. 16 is an exemplary hardware configuration of the information processing devices according to the first and second embodiments.

Next, a hardware configuration of the information processing device according to the first and second embodiments will be described with reference to FIG. 16. FIG. 16 is a functional block diagram illustrating an exemplary hardware configuration of the information processing device according to the first and second embodiments. An information processing device 900 shown in FIG. 16 may realize the information processing devices 10 and 50 shown in FIGS. 3 and 11, for example.

The information processing device 900 includes a CPU 901, a read only memory (ROM) 903, and a random access memory (RAM) 905. Furthermore, the information processing device 900 may include a host bus 907, a bridge 909, an external bus 911, an interface 913, an input device 915, an output device 917, and a storage device 919, a communication device 921, a drive 923, and a connection port 925. The information processing device 900 may include a DSP or a processing circuit called an application specific integrated circuit (ASIC), instead of or together with the CPU 901.

The CPU 901 functions as an arithmetic processing unit and a control unit, and controls all or a part of operations in the information processing device 900 according to various programs recorded in the ROM 903, the RAM 905, the storage device 919 or a removable recording medium 929. The ROM 903 stores a program, operation parameters, or the like used by the CPU 901. The RAM 905 primarily stores a program used in execution of the CPU 901, parameters in the execution, or the like. The CPU 901, the ROM 903, and the RAM 905 are connected to each other through the host bus 907 configured by an internal bus such as a CPU bus. Furthermore, the host bus 907 is connected to the external bus 911 such as a peripheral component interconnect/interface (PCI) bus through the bridge 909. The CPU 901 may configure the schema converting unit 110, the recommendation units 130 and 530, and the presentation control unit 170 according to the above-described first and second embodiments, for example.

The host bus 907 is connected to the external bus 911 such as a peripheral component interconnect/interface (PCI) bus through the bridge 909.

The input device 915 is configured by a device operated by a user, such as a mouse, a keyboard, a touch panel, a button, a switch, or a lever, for example. In addition, the input device 915 may be a remote control device (so-called a remote controller) using infrared or other radio waves, or may be an external connection device 931 such as a mobile phone or a PDA corresponding to operations of the information processing device 900. Furthermore, the input device 915 is configured by an input control circuit or the like that generates an input signal based on information input from a user using the above-described operation means and outputs the generated input signal to the CPU 901. The user of the information processing device 900 may operate the input device 915 to input a variety of data to the information processing device 900 or to instruct the information processing device 900 to perform a processing operation. In the first and second embodiments, a variety of information to be processed by the information processing device 10 or 50 may be input through the input device 915. In a case in which the input/output unit 160 shown in FIGS. 3 and 11 is integrally configured with the information processing device 10 or 50, the input/output unit 160 may be configured by the input device 915.

The output device 917 is configured by a device capable of visually or audibly notifying a user of acquired information. As such a device, a display device such as a CRT display device, a liquid crystal display device, a plasma display device, an EL display device, or a lamp, a voice output device such as a speaker or a headphone, a printer, or the like, may be used. The output device 917 outputs results obtained by various processes performed by the information processing device 900, for example. Specifically, the display device visually displays the results obtained by the various processes performed by the information processing device 900 in various forms such as a text, an image, a table, or a graph. On the other hand, the voice output device converts an audio signal formed by reproduced voice data, acoustic data, or the like into an analog signal and audibly outputs the result. In this embodiment, a variety of information processed by the information processing device 10 or 50 may be output through the output device 917. In a case in which the input/output unit 160 shown in FIGS. 3 and 11 is integrally configured with the information processing device 10 or 50, the input/output unit 160 may be configured by the output device 917.

The storage device 919 is a data storage device configured as an example of the storage device of the information processing device 900. The storage device 919 is configured by a magnetic storage device such as an HDD, a semiconductor storage device, an optical storage device, or a magneto-optical storage device, for example. The storage device 919 stores a program to be executed by the CPU 901, a variety of data, a variety of data acquired from the outside, or the like. The storage device 919 may configure various DBs provided in the information processing devices 10 and 50 according to the above-described first and second embodiments, for example.

The communication unit 921 is a communication interface configured by a communication device or the like for being connected to a communication network (network) 927, for example. The communication device 921 includes a communication card or the like for a wired or wireless local area network (LAN), Bluetooth (registered trademark) or Wireless USB (WUSB), for example. Furthermore, the communication device 921 may be an optical communication router, an asymmetric digital subscriber line (ADSL) router, various communication modems, or the like. The communication device 921 is capable of performing transmission or reception of signals or the like according to a predetermined protocol such as a TCP/IP, between the Internet and other communication devices, for example. Furthermore, a network 927 connected to the communication device 921 is configured by a network or the like connected in a wired or wireless manner, and for example, may be the Internet, a home LAN, infrared communication, radio wave communication, satellite communication, or the like. In the above-described first and second embodiments, for example, communication between the information processing devices 10 and 50 and other various configurations (for example, management systems, the input/output unit 160, the host profile information DB 140, and the Ad Log DB 560, or the like) may be executed through the network 927 using the communication device 921.

The drive 923 is a recording medium reader/writer, which is internally provided in the information processing device 900 or is externally provided. The drive 923 reads information recorded on a removable recording medium 929 which is mounted, such as a magnetic disc, an optical disc, a magneto-optical disc, or a semiconductor memory, and outputs the result to the RAM 905. The drive 923 is capable of writing information on the removable recording medium 929 which is mounted, such as a magnetic disc, an optical disc, a magneto-optical disc, or a semiconductor memory. The removable recording medium 929 is, for example, a DVD medium, an HD-DVD medium, a Blue-ray (registered trademark) medium, or the like. The removable recording medium 929 may be a CompactFlash (CF) (registered trademark), a flash memory, a secure digital (SD) memory card, or the like. The removable recording medium 929 may be an integrated circuit (IC) card on which a non-contact type IC chip is mounted, an electronic device, or the like, for example. In the first and second embodiments, for example, a variety of information processed by the information processing devices 10 and 50 may be read from the removable recording medium 929 using the drive 923, or may be written on the removable recording medium 929.

The connection port 925 is a port for directly connecting a device to the information processing device 900. As an example of the connection port 925, a universal serial bus (USB) port, an IEEE 1394 port, a small computer system interface (SCSI) port, or the like, may be used. As another example of the connection port 925, an RS-232C port, an optical audio terminal, a High-Definition Multimedia Interface (HDMI) (registered trademark) port, or the like may be used. By connecting an external connection device 931 to the connection port 925, the information processing device 900 directly acquires a variety of data from the external connection device 931, or provides a variety of data to the external connection device 931. In the first and second embodiments, for example, a variety of information processed by the information processing devices 10 and 50 may be acquired from the external connection device 931 through the connection port 925, or may be output to the external connection device 931, for example.

Hereinbefore, an example of a hardware configuration capable of realizing the functions of the information processing device 900 according to this embodiment is shown. The respective components may be configured using universal members, or may be configured by hardware specific to the functions of the respective components. Accordingly, according to a technical level at the time when the embodiments are executed, it is possible to appropriately change hardware configurations to be used.

In addition, a computer program for realizing each of the functions of the information processing device 900 according to the present embodiment may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. The computer program may be delivered through a network, for example, without using the recording medium.

5. Supplement

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

For example, in the second embodiment, an example in which the type of a web site which presents an event determined by the recommendation unit 530 to a user is not particularly limited is shown, but the present technique is not limited to such an example. For example, a configuration in which URL of a web site relevant to an event to be recommended is defined in advance and the recommendation unit 530 executes RTB at a timing when a user who is a recommendation target of the event visits the web site and displays an advertisement of the event may be used. Thus, media through which an event is presented is appropriately selected to be suitable for a user's preference, and thus, attraction of an advertisement is further strengthened.

Further, as described at the beginning, content handled in the above-described first and second embodiments is not limited to an event, and all types of content may be used. For example, the content may be an exhibit in auction, personal re-sales goods, or the like. In this case, an advertiser may not a company which performs content sales as a business, but may be an individual who is a seller at the auction or re-sales. In this way, the present technique may also be preferably applied to a system that individually sells content.

Additionally, the present technology may also be configured as below.

(1)

An information processing device including:

a schema converting unit that converts content meta-information managed by a plurality of different management systems into a common schema; and a recommendation unit that determines a combination of content to be recommended and a user based on commonized content meta-information which is obtained by the conversion into the common schema and content purchase history information in the respective management systems.

(2)

The information processing device according to (1), further including:

a sales strategy determination unit that determines a sales strategy of the content based on the commonized content meta-information and the content purchase history information in the respective management systems, wherein the recommendation unit determines the combination of the content to be recommended and the user based on the sales strategy determined by the sales strategy determination unit.

(3)

The information processing device according to (2), wherein the content is a quantitative merchandise in which at least one of a sales period and an amount for sale is limited, and wherein the sales strategy includes a promotion strategy of the content according to the sales period and the amount for sale.

(4)

The information processing device according to (3), wherein the promotion strategy includes at least one of the amount of promotion of the content according to the sales period and the amount for sale, a promotion time of the content according to the sales period and the amount for sale, an attribute of a user who is a promotion target of the content according to the sales period and the amount for sale, and cost performance of the promotion of the content according to the sales period and the amount for sale.

(5)

The information processing device according to any one of (2) to (4), further including:

a presentation control unit that presents the sales strategy determined by the sales strategy determination unit to a seller of the content and provides an interface through which the seller is able to designate a sales strategy to be used in a determination process in the recommendation unit based on the presented sales strategy.

(6)

The information processing device according to (5), wherein the recommendation unit determines the combination of the content to be recommended and the user further based on the sales strategy designated by the seller of the content through the interface provided by the presentation control unit.

(7)

The information processing device according to any one of (1) to (6), wherein the recommendation unit determines the combination of the content to be recommended and the user further based on behavior tendency information indicating a behavior tendency of the user in content purchase.

(8)

The information processing device according to any one of (1) to (7), wherein the recommendation unit determines a member registered in any one of the plurality of management systems as the user to whom the content is to be recommended.

(9)

The information processing device according to any one of (1) to (8), wherein the schema converting unit converts the commonized content meta-information relevant to the content determined by the recommendation unit into a schema capable of being provided for sale in a management system in which the user determined by the recommendation unit is registered as a member.

(10)

The information processing device according to any one of (1) to (9), wherein the recommendation unit determines the combination of the content to be recommended and the user further based on behavior history information indicating a behavior of the user on media.

(11)

The information processing device according to (10), wherein the behavior history information includes at least one of information indicating that a web site is read, information indicating that a link on the web site is selected, and information relevant to conversion on the web site.

(12)

The information processing device according to (10) or (11), wherein the recommendation unit determines a user of which the behavior history information is acquired, who is not a member registered in any one of the plurality of management systems, as the user to whom the content is to be recommended.

(13)

The information processing device according to any one of (1) to (12), wherein the content is an event for which a number of seats are limited.

(14)

An information processing method including:

converting content meta-information managed by a plurality of different management systems into a common schema, using a processor; and determining a combination of content to be recommended and a user based on commonized content meta-information which is obtained by the conversion into the common schema and content purchase history information in the respective management systems.

(15)

A program that causes a processor of a computer to realize:

a function for converting content meta-information managed by a plurality of different management systems into a common schema; and a function for determining a combination of content to be recommended and a user based on commonized content meta-information which is obtained by the conversion into the common schema and content purchase history information in the respective management systems.

REFERENCE SIGNS LIST 1, 2, 3 system
10, 50 information processing device
110 schema converting unit
120 commonized information DB
121 commonized event meta-information DB
122 commonized vacancy information DB
123 commonized member profile information DB
130, 530 recommendation unit
131 host profile information acquisition u nit
132 commonized information acquisition unit
133 purchase history information acquisition unit
134, 534 prediction model generation unit
135, 535 event-user determination unit
136, 537 sales strategy determination unit
140 host profile information DB
150 prediction engine
160 input/output unit
170 presentation control unit
210 event management system X
211 ticket sales system
212 event meta-information DB
213 vacancy information DB
214 member profile information DB
215 purchase history information DB
216 recommendation event presenting unit
220 event management system Y
230 event management system Z
536 behavior history information acquisition unit
560 AD Log DB

The invention claimed is:

1. An information processing device comprising:
a schema converting unit that converts content meta-information managed by a plurality of different management systems into a common schema;
a recommendation unit that determines a combination of content to be recommended and a user to whom the content is to be recommended based on commonized content meta-information which is obtained by the conversion into the common schema and content purchase history information in the respective management systems; and
a sales strategy determination unit that determines a sales strategy of the content, wherein the sales strategy includes a promotion strategy of the content according to a sales period and an amount for sale, and wherein the promotion strategy includes at least one of an amount of promotion of the content according to the sales period and the amount for sale, a promotion time of the content according to the sales period and the amount for sale, an attribute of a user who is a promotion target of the content according to the sales period and the amount for sale, and cost performance of the promotion of the content according to the sales period and the amount for sale.

2. The information processing device according to claim 1, wherein the sales strategy of the content is based on the commonized content meta-information and the content purchase history information in the respective management systems, wherein the recommendation unit determines the combination of the content to be recommended and the user based on the sales strategy determined by the sales strategy determination unit.

3. The information processing device according to claim 2, wherein the content is a quantitative merchandise in which at least one of the sales period and the amount for sale is limited.

4. The information processing device according to claim 2, further comprising:

a presentation control unit that presents the sales strategy determined by the sales strategy determination unit to a seller of the content and provides an interface through which the seller is able to designate a sales strategy to be used in a determination process in the recommendation unit based on the presented sales strategy.

5. The information processing device according to claim 4, wherein the recommendation unit determines the combination of the content to be recommended and the user further based on the sales strategy designated by the seller of the content through the interface provided by the presentation control unit.

6. The information processing device according to claim 1, wherein the recommendation unit determines the combination of the content to be recommended and the user further based on behavior tendency information indicating a behavior tendency of the user in a content purchase.

7. The information processing device according to claim 1, wherein the recommendation unit determines a member registered in any one of the plurality of management systems as the user to whom the content is to be recommended.

8. The information processing device according to claim 7, wherein the schema converting unit converts the commonized content meta-information relevant to the content determined by the recommendation unit into a schema capable of being provided for sale in a management system in which the user determined by the recommendation unit is registered as a member.

9. The information processing device according to claim 1, wherein the recommendation unit determines the combination of the content to be recommended and the user further based on behavior history information indicating a behavior of the user on media.

10. The information processing device according to claim 9, wherein the behavior history information includes at least one of information indicating that a web site is read, information indicating that a link on the web site is selected, and information relevant to conversion on the web site.

11. The information processing device according to claim 9, wherein the recommendation unit determines a user of which the behavior history information is acquired, who is not a member registered in any one of the plurality of management systems, as the user to whom the content is to be recommended.

12. The information processing device according to claim 1, wherein the content is an event for which a number of seats are limited.

13. An information processing method comprising:

converting content meta-information managed by a plurality of different management systems into a common schema, using a processor;

determining a combination of content to be recommended and a user to whom the content is to be recommended based on commonized content meta-information which is obtained by the conversion into the common schema and content purchase history information in the respective management systems; and determining a sales strategy of the content, wherein the sales strategy includes a promotion strategy of the content according to a sales period and an amount for sale, and wherein the promotion strategy includes at least one of an amount of promotion of the content according to the sales period and the amount for sale, a promotion time of the content according to the sales period and the amount for sale, an attribute of a user who is a promotion target of the content according to the sales period and the amount for sale, and cost performance of the promotion of the content according to the sales period and the amount for sale.

14. A non-transitory computer-readable storage medium that stores computer executable instructions, which when executed by circuitry, cause the circuitry to perform a method comprising:

converting content meta-information managed by a plurality of different management systems into a common schema;

determining a combination of content to be recommended and a user to whom the content is to be recommended based on commonized content meta-information which is obtained by the conversion into the common schema and content purchase history information in the respective management systems; and determining a sales strategy of the content, wherein the sales strategy includes a promotion strategy of the content according to a sales period and an amount for sale, and wherein the promotion strategy includes at least one of an amount of promotion of the content according to the sales period and the amount for sale, a promotion time of the content according to the sales period and the amount for sale, an attribute of a user who is a promotion target of the content according to the sales period and the amount for sale, and cost performance of the promotion of the content according to the sales period and the amount for sale.

* * * * *